(12) United States Patent
Sampath et al.

(10) Patent No.: US 11,601,189 B2
(45) Date of Patent: Mar. 7, 2023

(54) INITIAL BEAM SWEEP FOR SMART DIRECTIONAL REPEATERS

(71) Applicant: QUALCOMM Incorporated, San Diego, CA (US)

(72) Inventors: Ashwin Sampath, Skillman, NJ (US); Junyi Li, Chester, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/002,576

(22) Filed: Aug. 25, 2020

(65) Prior Publication Data

US 2021/0067237 A1    Mar. 4, 2021

Related U.S. Application Data

(60) Provisional application No. 62/892,519, filed on Aug. 27, 2019.

(51) Int. Cl.
| | |
|---|---|
| *H04B 7/155* | (2006.01) |
| *H04B 7/08* | (2006.01) |
| *H04B 7/06* | (2006.01) |
| *H04J 11/00* | (2006.01) |
| *H04W 48/10* | (2009.01) |
| *H04W 74/08* | (2009.01) |
| *H04W 84/04* | (2009.01) |

(52) U.S. Cl.
CPC ....... *H04B 7/15542* (2013.01); *H04B 7/0695* (2013.01); *H04B 7/088* (2013.01); *H04B 7/15507* (2013.01); *H04J 11/0073* (2013.01); *H04J 11/0076* (2013.01); *H04W 48/10* (2013.01); *H04W 74/0833* (2013.01); *H04W 84/045* (2013.01); *H04W 84/047* (2013.01)

(58) Field of Classification Search
CPC .. H04B 7/0695; H04B 7/088; H04B 7/15507; H04B 7/15542; H04J 11/0073; H04J 11/0076; H04W 48/10; H04W 56/0015; H04W 56/005; H04W 74/0833; H04W 84/045; H04W 84/047
See application file for complete search history.

(56) References Cited

U.S. PATENT DOCUMENTS

| | | | |
|---|---|---|---|
| 2018/0124718 A1 | 5/2018 | Ng et al. | |
| 2020/0229237 A1* | 7/2020 | Kim | H04W 74/0833 |
| 2020/0403689 A1* | 12/2020 | Rofougaran | H04B 7/165 |

(Continued)

OTHER PUBLICATIONS

International Search Report and Written Opinion—PCT/US2020/047969—ISA/EPO—dated Nov. 20, 2020.

(Continued)

*Primary Examiner* — Derrick V Rose
(74) *Attorney, Agent, or Firm* — Patterson & Sheridan, LLP

(57) ABSTRACT

Aspects of the present disclosure provide apparatus, methods, processing systems, and computer readable mediums to enhance functionality of directional repeaters (for instance, wireless devices that relay directional wireless signals). By adding even limited capability within the directional repeaters to buffer digital samples, the functionality of the directional repeaters may be enhanced to provide better coverage and make more efficient use of time, frequency, and spatial resources.

30 Claims, 14 Drawing Sheets

(56) References Cited

U.S. PATENT DOCUMENTS

2021/0021536 A1* 1/2021 Ganesan ............... H04L 1/1893
2021/0029736 A1* 1/2021 Kim .................. H04W 74/0833
2021/0352745 A1* 11/2021 Yang ..................... H04W 72/04

OTHER PUBLICATIONS

NTT Docomo, et al., "Discussion on Enhancements to Support NR Backhaul Links", 3GPP Draft, 3GPP TSG RAN WG1 Meeting #95, R1-1813316, Discussion on Enhancements to Support NR Backhaul Links Final, 3rd Generation Partnership Project (3GPP), Mobile Competence Centre, 650, Route Des Lucioles, F-06921 Sophia-Ant, vol. RAN WG1, No. Spokane, USA, Nov. 12, 2018-Nov. 16, 2018, Nov. 11, 2018 (Nov. 11, 2018), XP051555343, 10 pages, http://www.3gpp.org/ftp/Meetings%5F3GPP%5FSYNC/RAN1/Docs/R1%2D1813316%2Ezip.

Qualcomm Incorporated: "Enhancements to Support NR Backhaul links", 3GPP Draft, 3GPP TSG RAN WG1 Meeting #93, R1-1807393, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 12, 2018, XP051463084, 16 Pages, Retrieved from the Internet: URL:http://www.3gpp.org/ftp/tsg%5Fran/WG1%5FRL1/TSGR1%5F93/Docs [retrieved on May 12, 2018].

* cited by examiner

INITIAL BEAM SWEEP FOR SMART DIRECTIONAL REPEATERS

CROSS-REFERENCE TO RELATED APPLICATION

This application claims benefit of and priority to U.S. Provisional Patent Application No. 62/892,519, filed Aug. 27, 2019, which is hereby incorporated by reference in its entirety.

BACKGROUND

Field of the Disclosure

Aspects of the present disclosure relate to wireless communications, and more particularly, to techniques for coordinating beams used by a base station (BS) and a directional repeater, for example, for transmission and reception of acquisition related signaling, such as synchronization signal blocks (SSBs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more BSs may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or a DU may communicate with a set of UEs on downlink channels (e.g., for transmissions from the BS or the DU to the UE) and uplink channels (e.g., for transmissions from the UE to the BS or the DU).

These multiple access technologies have been adopted in various telecommunication standards to provide a common protocol that enables different wireless devices to communicate on a municipal, national, regional, and even global level. The NR (e.g., new radio or 5G) is an example of an emerging telecommunication standard. The NR is a set of enhancements to the LTE mobile standard promulgated by 3GPP. The NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that may include desirable communication in integrated access and backhaul (IAB) systems.

Certain aspects provide a method for wireless communications by a wireless device. The method generally includes determining a first set of one or more beams for receiving synchronization signal blocks (SSBs) from a base station (BS), determining a second set of one or more beams for transmitting the SSBs received via the first set of one or more beams, and relaying the SSBs from the BS to at least one second wireless device using the first and the second set of one or more beams.

Certain aspects provide a method for wireless communications by a BS. The method generally includes determining a first set of one or more beams for sending SSBs to at least a first wireless device, to be relayed by the first wireless device to a second wireless device via a second set of one or more beams, and transmitting the SSBs to the first wireless device using the first set of one or more beams.

Certain aspects provide an apparatus for wireless communications by a first wireless device. The apparatus may include at least one processor and a memory. The at least one processor and the memory may be configured to determine a first set of one or more beams for receiving SSBs from a BS. The at least one processor and the memory may be further configured to determine a second set of one or more beams for transmitting the SSBs received via the first set of beams. The at least one processor and the memory may be further configured to relay the SSBs from the BS to at least one second wireless device using the first and the second set of one or more beams.

Certain aspects provide an apparatus for wireless communications by a BS. The apparatus may include at least one processor and a memory. The at least one processor and the memory may be configured to determine a first set of one or more beams for sending SSBs to at least a first wireless device, to be relayed by the first wireless device to a second wireless device via a second set of one or more beams. The at least one processor and the memory may be further configured to transmit the SSBs to the first wireless device using the first set of one or more beams.

Aspects of the present disclosure also provide various apparatus, means, and computer readable mediums for (or capable of) performing operations described above.

To the accomplishment of the foregoing and related ends, the one or more aspects including the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
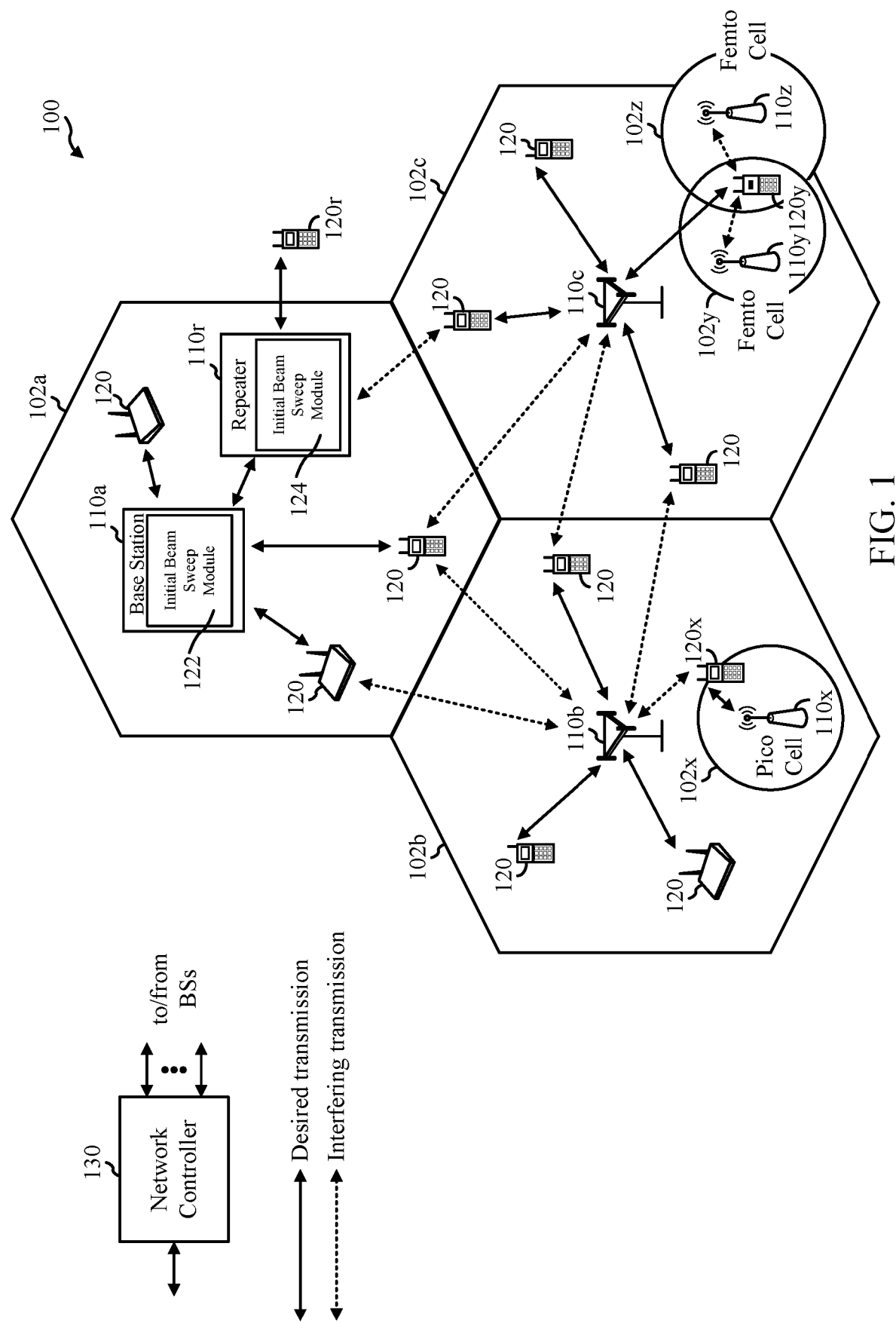
FIG. 1 is a block diagram conceptually illustrating an example wireless system, in accordance with certain aspects of the present disclosure.

Aspects of the present disclosure provide apparatus, methods, processing systems, and computer readable mediums to perform an initial beam sweep of transmission between a base station (BS) and one or more directional repeaters (for example, one or more wireless devices that may relay directional wireless signals) that are considered enhanced (or "smart") relative to conventional repeaters that are basically limited to receiving, amplifying, and relaying radio frequency (RF) signals. In one aspect, the initial beam sweep of the transmission between the BS and the one or more directional repeaters is executed such that a first repeater of the one or more directional repeaters may use a single broad beam to transmit swept synchronization signal blocks (SSBs) from the BS. This technique may be executed when an angular space covered by the first repeater is limited. In another aspect, the initial beam sweep of the transmission between the BS and the one or more directional repeaters is executed such that a second repeater of the one or more directional repeaters may time-division multiplexing (TDM) its SSB sweeps with that of the BS in a coordinated fashion with the BS. This technique may provide a high amount of flexibility. In yet another aspect, the initial beam sweep of the transmission between the BS and the one or more directional repeaters is executed such that a third repeater of the one or more directional repeaters may select one or more SSB beams from the BS and may sweep just during those transmissions. This technique may enable reduced amount of overhead with some ability for the third repeater to sweep.

The following description provides examples of techniques for coordinating beams used by the BS and the one or more directional repeater, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as long-term evolution (LTE), code division multiple access (CDMA), time division multiple access (TDMA), frequency division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as New Radio (NR) (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3rd Generation Partnership Project (3GPP) LTE and LTE-Advanced (LTE-A) are releases of UMTS that use E-UTRA. UTRA, E-UTRA, UMTS, LTE, LTE-A and GSM are described in documents from an organization named 3GPP. CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These wireless communication services may include latency and reliability requirements. These wireless communication services may also have different transmission time intervals (TTI) to meet respective quality of service (QoS) requirements. In addition, these wireless communication services may co-exist in the same subframe.

The teachings herein may be incorporated into (e.g., implemented within or performed by) a variety of wired or wireless apparatuses (e.g., nodes). In some aspects, a wireless node implemented in accordance with the teachings herein may comprise an access point (AP) or an access terminal (AT).

The AP may comprise, be implemented as, or known as a node B (NB), a radio network controller (RNC), an evolved node B (eNB), a base station controller (BSC), a base transceiver station (BTS), a base station (BS), a transceiver function (TF), a radio router, a radio transceiver, a basic service set (BSS), an extended service set (ESS), a radio base station ("RBS"), an integrated access and backhauling (IAB) node (e.g., an IAB donor node, an IAB parent node, and an IAB child node), or some other terminology.

The AT may comprise, be implemented as, or known as a subscriber station, a subscriber unit, a mobile station, a remote station, a remote terminal, a user terminal, a user agent, a user device, a user equipment (UE), a user station, or some other terminology. In some implementations, the AT may comprise a cellular telephone, a cordless telephone, a session initiation protocol (SIP) phone, a wireless local loop (WLL) station, a personal digital assistant (PDA), a handheld device having wireless connection capability, a station (STA), or some other suitable processing device connected to a wireless modem (such as an augmented reality (AR)/virtual reality (VR) console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates an example wireless communication network 100 in which aspects of the present disclosure may be performed. For example, as shown in FIG. 1, a BS 110*a* may include an initial beam sweep module 122, which may be designed and configured to sweep across a set of beams when transmitting SSBs to a repeater 110*r*. As illustrated, the repeater 110*r* may also have an initial beam sweep module 124, for example, to process (e.g., receive and relay) the SSBs transmitted by the BS 110*a* during the initial beam sweep. In some cases, the repeater 110*r* and the BS 110*a* may be configured to perform operations 1000 and 1100 of FIGS. 10 and 11, respectively.

The wireless communication network 100 may, for example, be a NR or 5G network. As illustrated in FIG. 1, the wireless communication network 100 may include a number of BSs (or APs) 110*a-z* (each also individually referred to herein as AP 110 or collectively as APs 110) and other network entities. An AP 110 may be a station that communicates with UEs 120*a-y* (each also individually referred to herein as UE 120 or collectively as UEs 120). Each AP 110 may provide communication coverage for a particular geographic area. In 3GPP, the term "cell" can refer to a coverage area of a NB and/or a NB subsystem serving this coverage area, depending on the context in which the term is used. In NR systems, the term "cell" and next generation NB (for example, gNB or gNodeB), NR AP, 5G NB, or transmission reception point (TRP) may be interchangeable. In some examples, the cell may not necessarily be stationary, and the geographic area of the cell may move according to a location of a mobile AP 110. In some examples, the APs 110 may be interconnected to one another and/or to one or more other APs 110 or network nodes (not shown) in the wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. The RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, the NR or 5G RAT networks may be deployed.

The AP 110 may provide communication coverage for a macro cell, a pico cell, a femto cell, and/or other types of cells. The macro cell may cover a relatively large geographic area (e.g., several kilometers in radius) and may allow unrestricted access by the UEs 120 with service subscription. The pico cell may cover a relatively small geographic area and may allow unrestricted access by UEs with service subscription. A femto cell may cover a relatively small geographic area (e.g., a home) and may allow restricted access by the UEs 120 having an association with the femto cell (e.g., the UEs 120 in a closed subscriber group (CSG), the UEs 120 for users in the home, etc.). The AP for a macro cell may be referred to as a macro AP. The AP 110 for a pico cell may be referred to as a pico AP. The AP 110 for a femto cell may be referred to as a femto AP or a home AP. In the example shown in FIG. 1, the APs 110a, 110b and 110c may be macro APs for the macro cells 102a, 102b and 102c, respectively. The AP 110x may be a pico AP for a pico cell 102x. The APs 110y and 110z may be femto APs for the femto cells 102y and 102z, respectively. The AP 110 may support one or multiple (e.g., three) cells.

The wireless communication network 100 may also include relay stations. A relay station is a station that receives a transmission of data and/or other information from an upstream station (e.g., the AP 110 or the UE 120) and sends a transmission of the data and/or other information to a downstream station (e.g., the UE 120 or the AP 110). The relay station may also be the UE 120 that relays transmissions for other UEs 120. In the example shown in FIG. 1, a relay station may communicate with the AP 110a and a UE 120r in order to facilitate communication between the AP 110a and the UE 120r. The relay station may also be referred to as an IAB node, a relay AP, a relay, etc.

The wireless communication network 100 may be a heterogeneous network that includes APs 110 of different types, e.g., macro AP, pico AP, femto AP, relays, etc. These different types of APs 110 may have different transmit power levels, different coverage areas, and different impact on interference in the wireless communication network 100. For example, the macro AP may have a high transmit power level (e.g., 20 Watts) whereas the pico AP, the femto AP, and the relays may have a lower transmit power level (e.g., 1 Watt).

The wireless communication network 100 may support synchronous or asynchronous operation. For synchronous operation, the APs 110 may have similar frame timing, and transmissions from the different APs 110 may be approximately aligned in time. For asynchronous operation, the APs 110 may have different frame timing, and transmissions from the different APs 110 may not be aligned in time. The techniques described herein may be used for both synchronous and asynchronous operation.

A network controller 130 may couple to a set of APs 110 and provide coordination and control for these APs 110. The network controller 130 may communicate with the APs 110 via a backhaul. The APs 110 may also communicate with one another (e.g., directly or indirectly) via wireless or wireline backhaul.

The UEs 120 (e.g., 120x, 120y, etc.) may be dispersed throughout the wireless communication network 100, and each UE 120 may be stationary or mobile. The UE 120 may also be referred to as a mobile station, a terminal, an AT, a subscriber unit, a station, a customer premises equipment (CPE), a cellular phone, a smart phone, a PDA, a wireless modem, a wireless communication device, a handheld device, a laptop computer, a cordless phone, a WLL station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, an industrial manufacturing equipment, a global positioning system device, or any other suitable device that is configured to communicate via a wireless or wired medium. Some UEs may be considered machine-type communication (MTC) devices or evolved MTC (eMTC) devices. The MTC and the eMTC UEs may include, for example, robots, drones, remote devices, sensors, meters, monitors, location tags, etc., that may communicate with an AP 110, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, which may be narrowband IoT (NB-IoT) devices.

Certain wireless networks (e.g., LTE) utilize orthogonal frequency division multiplexing (OFDM) on DL and single-carrier frequency division multiplexing (SC-FDM) on UL. The OFDM and the SC-FDM partition the system bandwidth into multiple (K) orthogonal subcarriers, which are also commonly referred to as tones, bins, etc. Each subcarrier may be modulated with data. In general, modulation symbols are sent in a frequency domain with the OFDM and in a time domain with the SC-FDM. The spacing between adjacent subcarriers may be fixed, and a total number of subcarriers (K) may be dependent on a system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for the system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for the system bandwidth of 1.25, 2.5, 5, 10 or 20 MHz, respectively.

While aspects of the examples described herein may be associated with the LTE technologies, aspects of the present disclosure may be applicable with other wireless communications systems, such as the NR. The NR may utilize OFDM with a CP on the uplink and the downlink and include support for half-duplex operation using time division duplex (TDD). Beamforming may be supported and beam direction may be dynamically configured. Multiple-input and multiple-output (MIMO) transmissions with precoding may also be supported. MIMO configurations in the DL may support up to 8 transmit antennas with multi-layer DL transmissions up to 8 streams and up to 2 streams per UE 120. Multi-layer transmissions with up to 2 streams per UE 120 may be supported. Aggregation of multiple cells may be supported with up to 8 serving cells.

In some examples, access to the air interface may be scheduled. A scheduling entity (e.g., the AP 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. The APs 110 are not the only entities that may function as the scheduling entity. In some examples, the UE 120 may function as a scheduling entity and may schedule resources for one or more subordinate entities (e.g., one or more other UEs 120), and the other UEs 120 may utilize the resources scheduled by the UE 120 for wireless communication. In some examples, the UE 120 may function as the scheduling entity in a peer-to-peer (P2P) network, and/or in a mesh network. In a mesh network example, the UEs 120 may communicate directly with one another in addition to communicating with the scheduling entity.

In FIG. 1, a solid line with double arrows indicates desired transmissions between the UE 120 and the serving AP 110, which is the AP 110 designated to serve the UE 120 on the DL and/or the UL. A finely dashed line with double arrows indicates interfering transmissions between the UE 120 and the AP 110.

Figure 2:
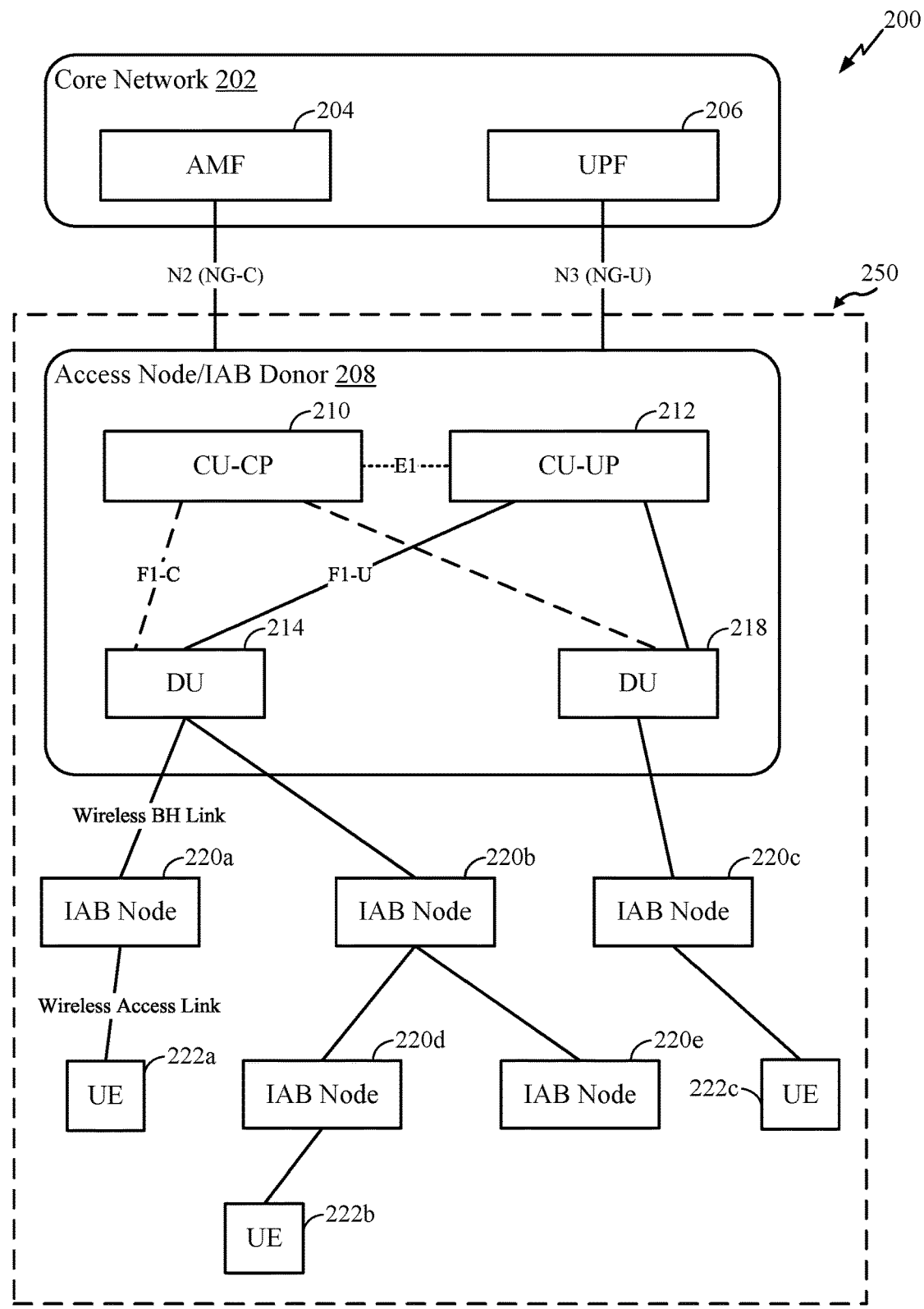
FIG. 2 is a block diagram conceptually illustrating an example architecture of a distributed radio access network (RAN), in accordance with certain aspects of the present disclosure.

FIG. 2 illustrates an example architecture of a distributed radio access network (RAN) 200 an example IAB network 250, which may be implemented in the wireless communication network 100 illustrated in FIG. 1. As shown in FIG. 2, the distributed RAN 200 includes core network (CN) 202 and access node (AN) configured as an IAB donor 208.

As shown in FIG. 2, the IAB network 250 includes the IAB donor node 208. The IAB donor node 208 is a RAN node (e.g., access point/gNB that terminates the NR Ng interface with the CN 202 (e.g., next generation NG core)) and is generally connected to the CN 202 via a wireline backhaul link. The CN 202 may host core network functions. The CN 202 may be centrally deployed. The CN 202 functionality may be offloaded (e.g., to advanced wireless services (AWS)), in an effort to handle peak capacity. The CN 202 may include access and mobility management function (AMF) 204 and user plane function (UPF) 206. The AMF 204 and the UPF 206 may perform one or more of the CN 202 functions.

The IAB donor node 208 may communicate with the CN 202 (e.g., via a backhaul interface). The IAB donor node 208 may communicate with the AMF 204 via an N2 (e.g., NG-C) interface. The IAB donor node 208 may communicate with the UPF 206 via an N3 (e.g., NG-U) interface. The IAB donor node 208 may include a central unit-control plane (CU-CP) 210, one or more central unit-user plane (CU-UPs) 212, one or more distributed units (DUs) 214,218, and one or more antenna/remote radio units (AU/RRUs) (not shown). The CUs and DUs may also be referred to as gNB-CU and gNB-DU, respectively.

The IAB donor node 208 may also be referred to as an IAB anchor node and may include an IAB central unit (e.g., NR CU) or an IAB Distributed Unit (e.g., NR DU). The IAB network 250 further includes one or more non-donor IAB nodes (e.g., 220a-220e). Each IAB node (including donor and non-donor IAB nodes) may serve one or more UEs (e.g., 222a-222c) connected to an IAB node. As shown, the IAB nodes, including the donor IAB donor node 208, may be connected via wireless backhaul links (e.g., NR wireless backhaul links or backup NR wireless backhaul links). Each IAB node connects to its served UEs via respective access links.

Each IAB node is the RAN node (e.g., access point/gNB) that provides IAB functionality with two roles including data unit function (DU-F) and a mobile termination function (MT-F). The DU-F of the IAB node is generally responsible for scheduling UEs (e.g., served by the IAB node) and other IAB nodes (e.g., that are connected as child nodes to the IAB node). The DU-F also controls both access and backhaul links under its coverage. The MT-F of the IAB node is controlled and scheduled by the IAB donor node 208 or another IAB node as its parent IAB node. In an aspect, the IAB donor node 208 only includes DU-F and no MT-F.

The CU-CP 210 may be connected to one or more of the DUs 214, 218. The CU-CP 210 and the DUs 214, 218 may be connected via a wireline interface using F1-C protocols. As shown in FIG. 2, the CU-CP 210 may be connected to multiple DUs, but the DUs 214, 218 may be connected to only one CU-CP. Although FIG. 2 only illustrates one CU-UP 212, the IAB donor node 208 may include multiple CU-UPs. The CU-CP 210 selects the appropriate CU-UP(s) for requested services (e.g., for the UE). The CU-UP(s) 212 may be connected to the CU-CP 210. For example, the CU-UP(s) 212 and the CU-CP 210 may be connected via an E1 interface. The CU-CP(s) 212 may be connected to one or more of the DUs 214, 218. The CU-UP(s) 212 and DUs 214, 218 may be connected via a F1-U interface. As shown in FIG. 2, the CU-CP 210 may be connected to multiple CU-UPs, but the CU-UPs may be connected to only one CU-CP.

The DU, such as DUs 214 and/or 218, may host one or more transmit/receive points (TRP(s)), which may include an edge node (EN), an edge unit (EU), a radio head (RH), a smart radio head (SRH), or the like). The DU may be located at edges of the network with radio frequency (RF) functionality. The DUs 214, 216 may be connected to multiple CU-UPs 212 that are connected to (e.g., under the control of) the same CU-CP (e.g., for RAN sharing, radio as a service (RaaS), and service specific deployments). The DUs 214, 216 may be configured to individually (e.g., dynamic selection) or jointly (e.g., joint transmission) serve traffic to the UE. Each DU 214, 218 may be connected with one of AU/RRUs.

The CU-CP 210 may be connected to multiple DU(s) 214, 218 that are connected to (e.g., under control of) the same CU-UP 212. Connectivity between the CU-UP 212 and the DU 214, 218 may be established by the CU-CP 210. For example, the connectivity between the CU-UP 212 and the DU 214, 218 may be established using Bearer Context Management functions. Data forwarding between the CU-UP(s) 212 may be via a Xn-U interface.

The distributed RAN 200 may support fronthauling solutions across different deployment types. For example, the distributed RAN 200 architecture may be based on transmit network capabilities (e.g., bandwidth, latency, and/or jitter). The distributed RAN 200 may share features and/or components with the LTE. For example, the IAB donor node 208 may support dual connectivity with the NR and may share a common fronthaul for the LTE and the NR. The distributed RAN 200 may enable cooperation between and among the DUs 214, 218, for example, via the CU-CP 212. An inter-DU interface may not be used.

Logical functions may be dynamically distributed in the distributed RAN 200. As will be described in more detail with reference to FIG. 4, the RRC layer, Packet Data Convergence Protocol (PDCP) layer, Radio Link Control (RLC) layer, Medium Access Control (MAC) layer, Physical (PHY) layers, and/or RF layers may be adaptably placed, in the AN and/or the UE.

Figure 3:
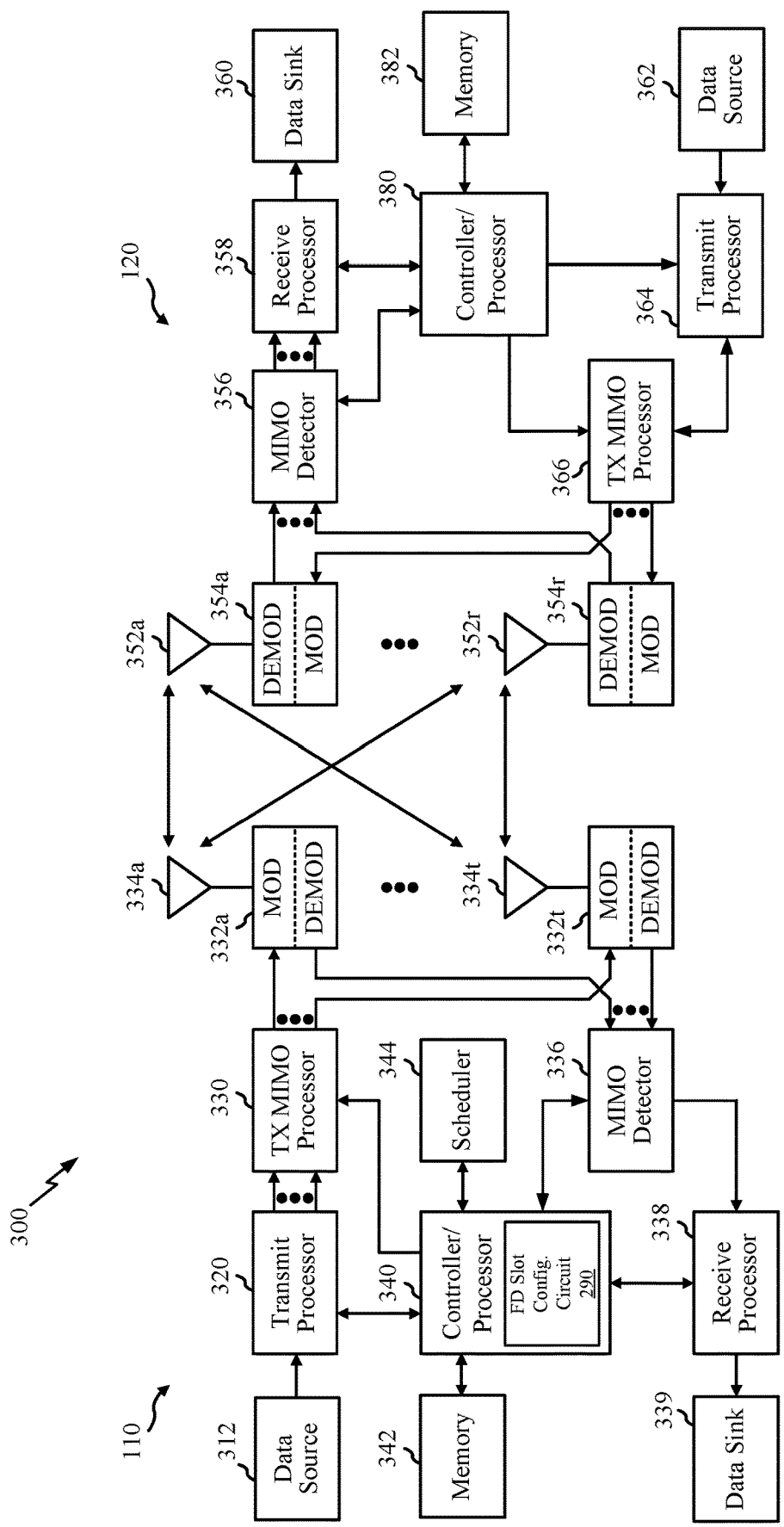
FIG. 3 illustrates example components of a base station (BS) and a user equipment (UE), in accordance with certain aspects of the present disclosure.

FIG. 3 illustrates example components 300 of AP 110 and UE 120 (as depicted in FIG. 1), which may be used to implement aspects of the present disclosure. For example, antennas 352, processors 366, 358, 364, and/or a controller/processor 380 of the UE 120 and/or antennas 334, processors 320, 330, 338, and/or a controller/processor 340 of the AP 110 may be used to perform various techniques and methods described herein. For example, as shown in FIG. 3, the processor 340 includes an full-duplex (FD) slot configuration circuit 290 that may be configured for full-duplex slot configuration in an IAB communication systems, according to aspects described herein. In certain aspects, the FD slot communication circuit 290 enables the processor 340 to detect a change in one or more traffic parameters, and dynamically modify a slot pattern based on the change in the one or more traffic parameters. In certain aspects, the AP 110 may be an IAB donor node, a parent node, or an IAB child node.

At the AP 110, a transmit processor 320 may receive data from a data source 312 and control information from the controller/processor 340. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. The processor 320 may process (e.g., encode and symbol map) the data and the control information to obtain data symbols and control symbols, respectively. The transmit processor 320 may also generate reference symbols, e.g., for a primary synchronization signal (PSS), a secondary synchronization signal (SSS), and a cell-specific reference signal (CRS). A transmit MIMO processor 330 may perform spatial processing (e.g., precoding) on the data symbols, the control symbols, and/or the reference symbols, if applicable, and may provide output symbol streams to the modulators (MODs) 332a through 332t. Each MOD 332 may process a respective output symbol stream (e.g., for OFDM, etc.) to obtain an output sample stream. Each MOD may further process (e.g., convert to analog, amplify, filter, and upconvert) the output sample stream to obtain a DL signal. The DL signals from MODs 332a through 332t may be transmitted via the antennas 334a through 334t, respectively.

At the UE 120, the antennas 352a through 352r may receive the DL signals from the AP 110 and may provide received signals to the demodulators (DEMODs) in transceivers 354a through 354r, respectively. Each DEMOD in the transceiver 354 may condition (e.g., filter, amplify, downconvert, and digitize) a respective received signal to obtain input samples. Each DEMOD in the transceiver 354 may further process the input samples (e.g., for OFDM, etc.) to obtain received symbols. A MIMO detector 356 may obtain received symbols from all the DEMODs in the transceivers 354a through 354r, to perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the UL, at the UE 120, a transmit processor 364 may receive and process data (e.g., for a physical uplink shared channel (PUSCH)) from a data source 362 and the control information (e.g., for a physical uplink control channel (PUCCH)) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the DEMODs in the transceivers 354a through 354r (e.g., for SC-FDM, etc.), and transmitted to the AP 110. At the AP 110, the UL signals from the UE 120 may be received by the antennas 334, processed by the MODs 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the AP 110 and the UE 120, respectively. The processor 340 and/or other processors and modules at the AP 110 may perform or direct the execution of processes for the techniques described herein. Memories 342 and 382 may store data and program codes for the AP 110 and UE 120, respectively. A scheduler 344 may schedule the UEs for data transmission on the DL and/or the UL.

Figure 4:
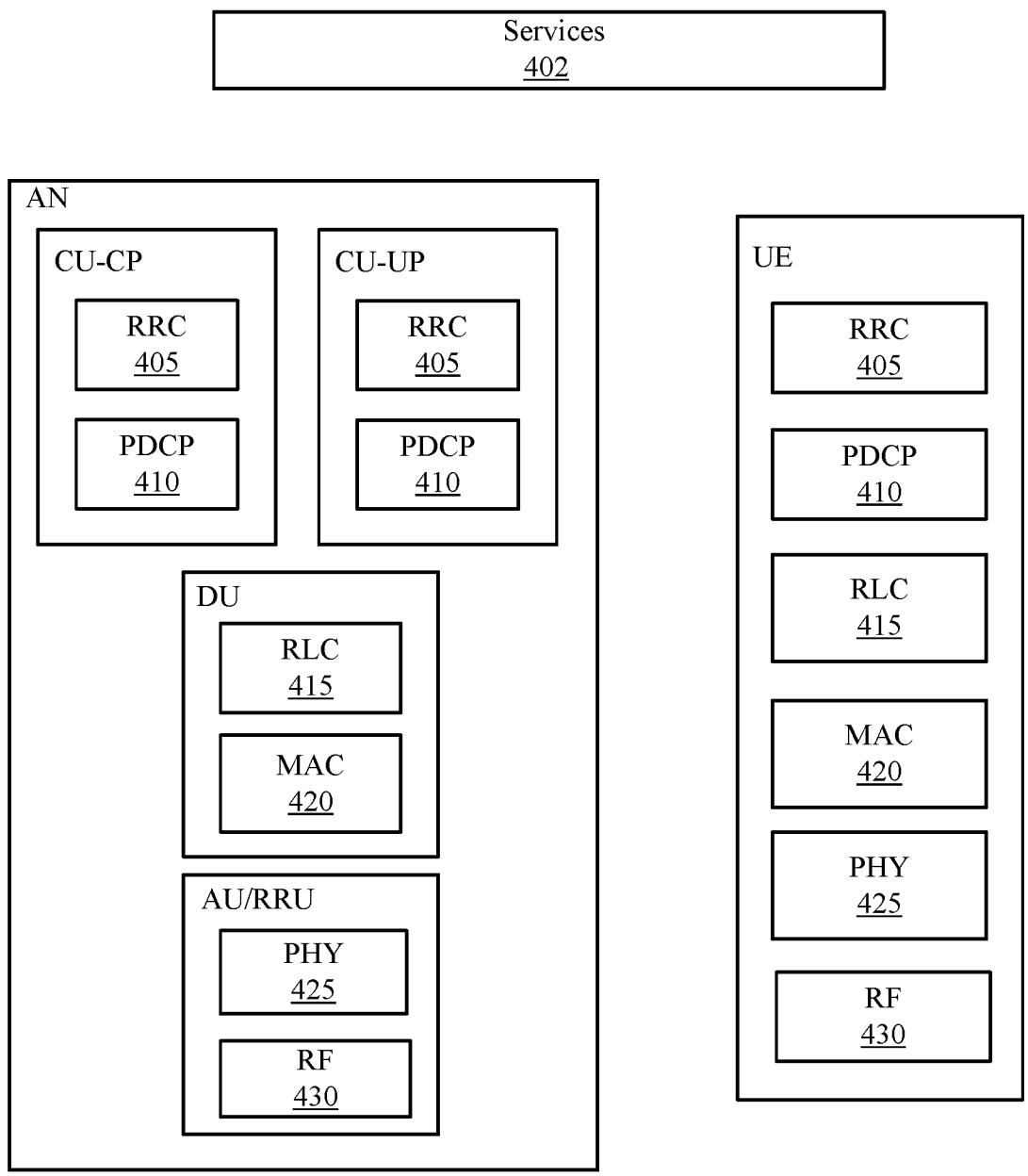
FIG. 4 is a block diagram illustrating an example communications protocol stack in a RAN, in accordance with certain aspects of the present disclosure.

FIG. 4 illustrates a diagram showing examples for implementing a communications protocol stack 400 in a RAN (e.g., such as the RAN 200), according to aspects of the present disclosure. The communications protocol stack 400 may be implemented by devices operating in a wireless communication system, such as a 5G NR system (e.g., the wireless communication network 100 of FIG. 1). In various examples, layers of the communications protocol stack 400 may be implemented as separate modules of software, portions of a processor or application specific integrated circuit (ASIC), portions of non-collocated devices connected by a communications link, or various combinations thereof. Collocated and non-collocated implementations may be used, for example, in a protocol stack for a network access device or a UE. As shown in FIG. 4, the wireless communication system may support various services 402 over one or more protocols. One or more protocol layers of the communication protocol stack 400 may be implemented by an AN (e.g., AN 208 in FIG. 2, or AP 110a in FIG. 1) and/or the UE (e.g., UE 120).

As shown in FIG. 4, the communication protocol stack 400 is split in the AN. A RRC layer 405, a PDCP layer 410, a RLC layer 415, a MAC layer 420, a PHY layer 425, and a RF layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222a-222c) may implement the entire communications protocol stack 400 (e.g., the RRC layer 405, the PDCP layer 410, the RLC layer 415, the MAC layer 420, the PHY layer(s) 425, and the RF layer(s) 430).

Figure 5:
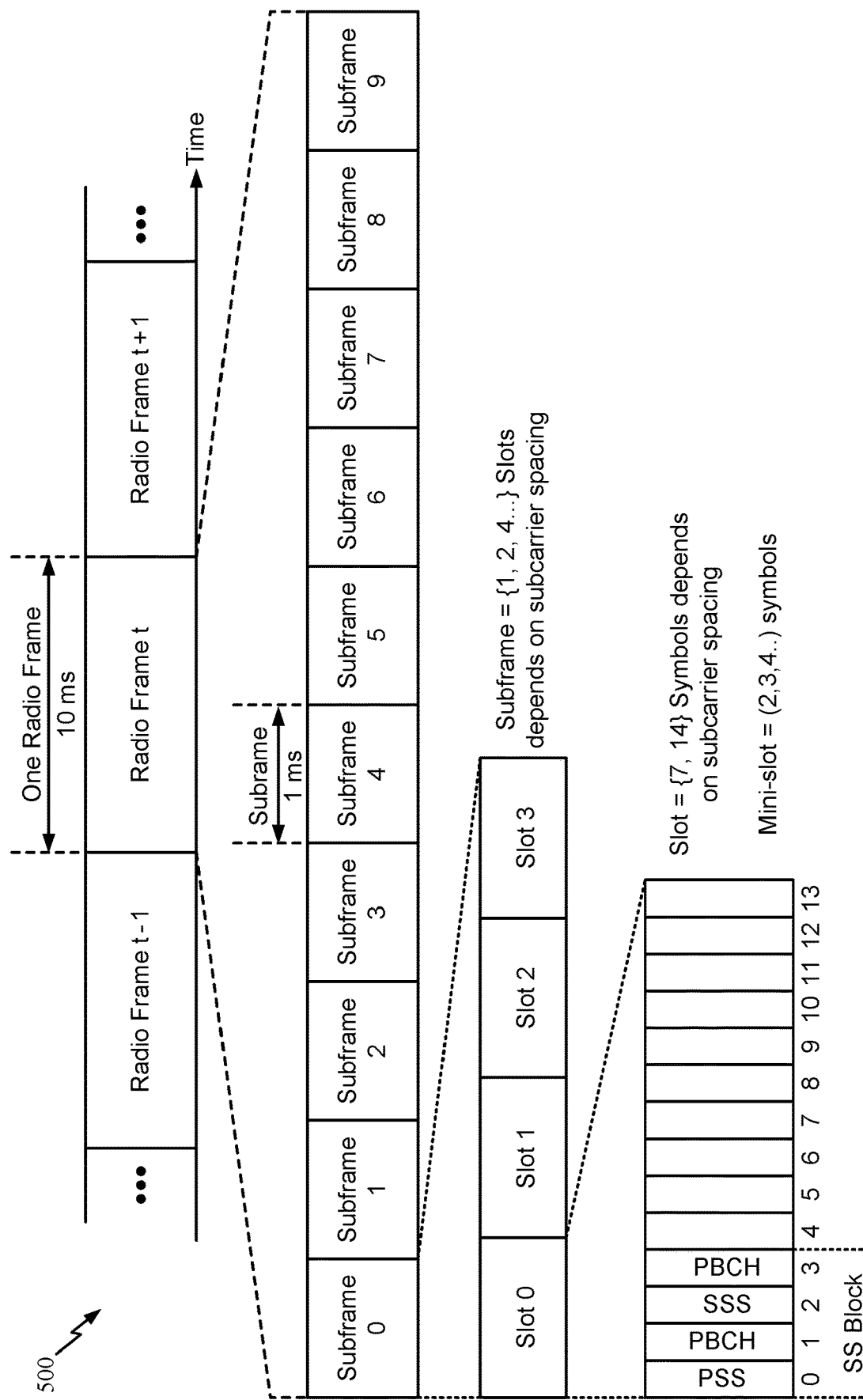
FIG. 5 is a block diagram is a diagram illustrating an example of a frame format for new radio (NR), in accordance with certain aspects of the present disclosure.

FIG. 5 is a diagram showing an example of a frame format 500 for NR. The transmission timeline for each of DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., the DL, the UL, or flexible) for data transmission and the link direction for each subframe may be dynamically switched. The link directions may be based on a slot format. Each slot may include DL/UL data as well as DL/UL control information.

In the NR, a SSB is transmitted. The SSB includes a PSS, a SSS, and a two symbol PBCH. The SSB can be transmitted in a fixed slot location, such as the symbols 0-3 as shown in FIG. 5. The PSS and the SSS may be used by UEs for cell search and acquisition. The PSS may provide half-frame timing, the SS may provide CP length and frame timing. The PSS and the SSS may provide cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs) such as system information block type 1 (SIB1), other system information (OSI) can be transmitted on a PDSCH in certain subframes. The SS block can be transmitted up to sixty-four times, for example, with up to sixty-four different beam directions for mmW. The up to sixty-four transmissions of the SS block are referred to as the SS burst set. The SS blocks in an SS burst set are transmitted in a same frequency region, while the SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through a scheduling entity (e.g., UE or AP), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select the dedicated set of resources for transmitting a pilot signal to a network. When operating in the RRC common state, the UE may select the common set of resources for transmitting the pilot signal to the network. In either case, the pilot signal transmitted by the UE may be received by one or more network access devices, such as an AN, or a DU, or portions thereof. Each receiving network access device may be configured to receive and measure the pilot signals transmitted on the common set of resources, and also receive and measure the pilot signals transmitted on the dedicated sets of resources allocated to the UEs for which the network access device is a member of a monitoring set of network access devices for the UE. One or more of the receiving network access devices, or a CU to which the receiving network access device(s) transmit the measurements of the pilot signals, may use the measurements to identify serving cells for the UEs, or to initiate a change of the serving cell for one or more of the UEs.

Example Directional Repeater

Next generation (5G) wireless networks have stated objectives to provide ultra-high data rate and support wide scope of application scenarios. IAB systems have been studied in 3GPP as one possible solution to help support these objectives.

As noted above, in the IAB system, a wireless backhaul solution is adopted to connect cells (IAB-nodes) to a core network (which uses a wired backhaul). Some attractive characteristics of the IAB system are support for multi-hop wireless backhaul, sharing of a same technology (e.g., NR) and resources (e.g., frequency bands) for both access and backhaul links.

There are various possible architectures for the IAB-nodes, including layer-2 (L2) and layer-3 (L3) solutions and a particular architecture deployed may depend on what layers of protocol stack are implemented in intermediate nodes (IAB-nodes), for example, L2 relays may implement PHY/MAC/RLC layers.

Certain aspects of the present disclosure relate to L1 relays (referred to as repeaters). L1 relays/repeaters may have many features. For example, such repeaters are relatively simple, low-cost, low-power, and are wirelessly connected to a donor or another relay (e.g., a gNB).

Figure 6:
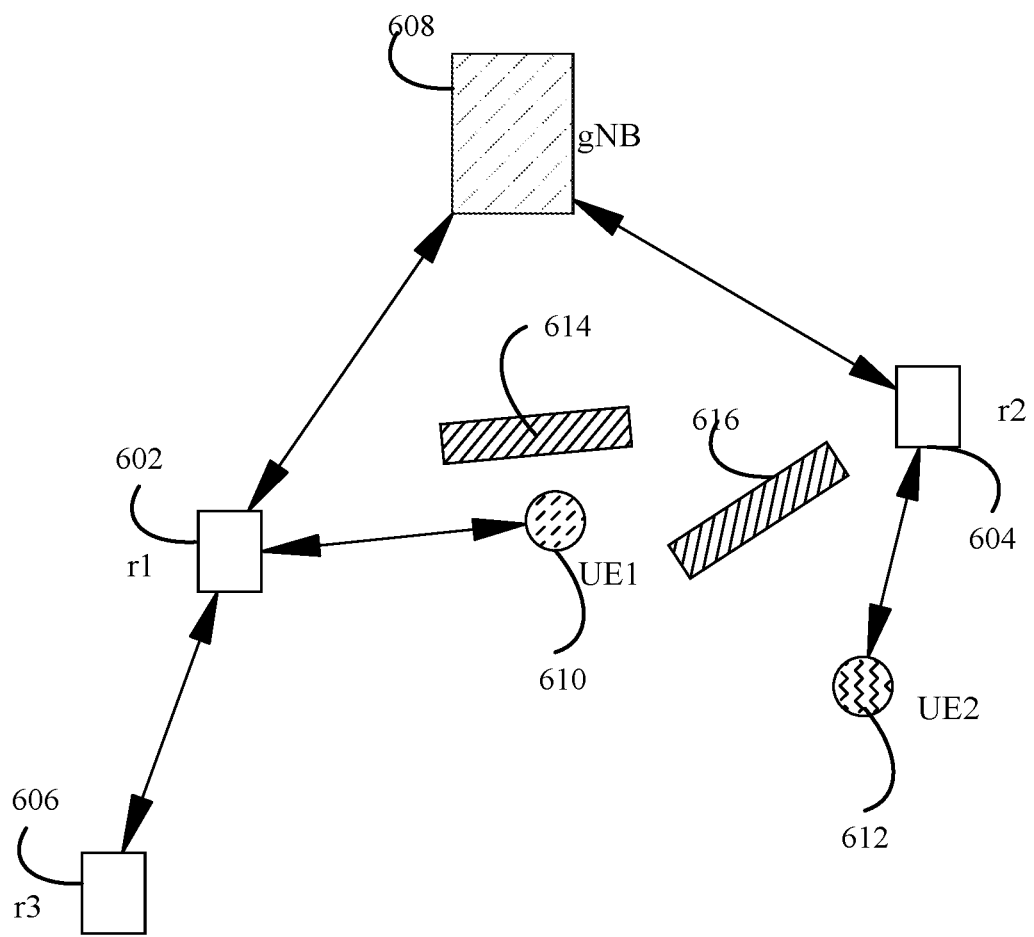
FIG. 6 is a block diagram of an example wireless system deploying repeaters, in which aspects of the present disclosure may be implemented.

FIG. 6 illustrates one example application of how repeaters may be used to help improve coverage by overcoming blockage (for instance, obstruction of RF signals by an object). It is generally understood that the blockage is a major issue in millimeter wave (MMW) where beamforming is used to send directional RF signals. In the illustrated example, repeaters (for example, r1 602, r2 604, and r3 606) may allow a gNB 608 to serve UEs (for example, UE1 610 and UE2 612) even though objects prevent gNB directional RF signals from reaching the UEs.

As illustrated, because the r1 602 is not blocked by the objects, the r1 602 may receive the RF signals from the gNB 608 and re-transmit the RF signals to reach the UE1 610 (although the UE1 610 is blocked by the first object 614 from receiving the RF signals directly from the gNB 608). Similarly, because the r2 606 is not blocked by the objects, the r2 606 may receive the RF signals from the gNB 608 and re-transmit the RF signals to reach the UE2 612 (although the UE2 612 is blocked by the second object 616 from receiving the RF signals directly from the gNB 608). As demonstrated by this example, L1 repeaters may serve as relatively simple and inexpensive solutions to provide protection against the blockage by the objects, extend the coverage of a MMW cell, and fill coverage holes.

Figure 7A:
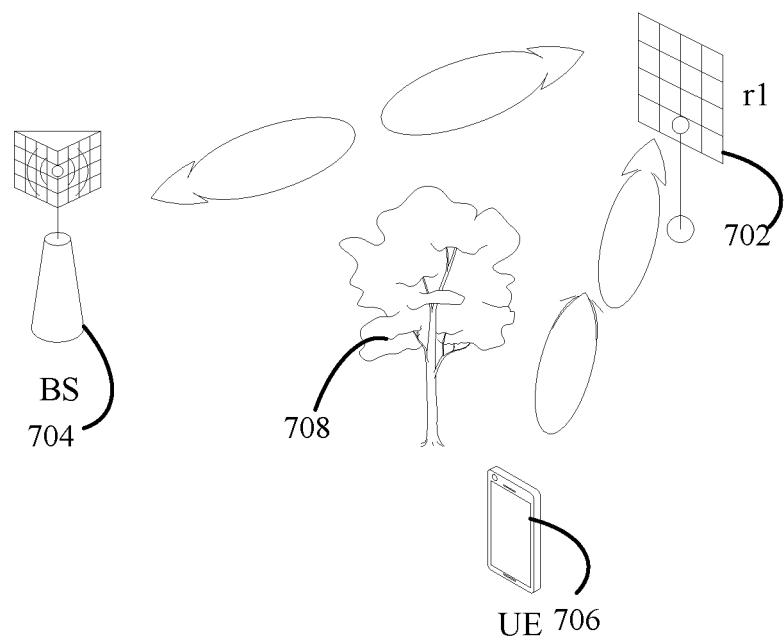
FIGS. 7A and 7B illustrate an example scenario, in which aspects of the present disclosure may be implemented.
Figure 7B:
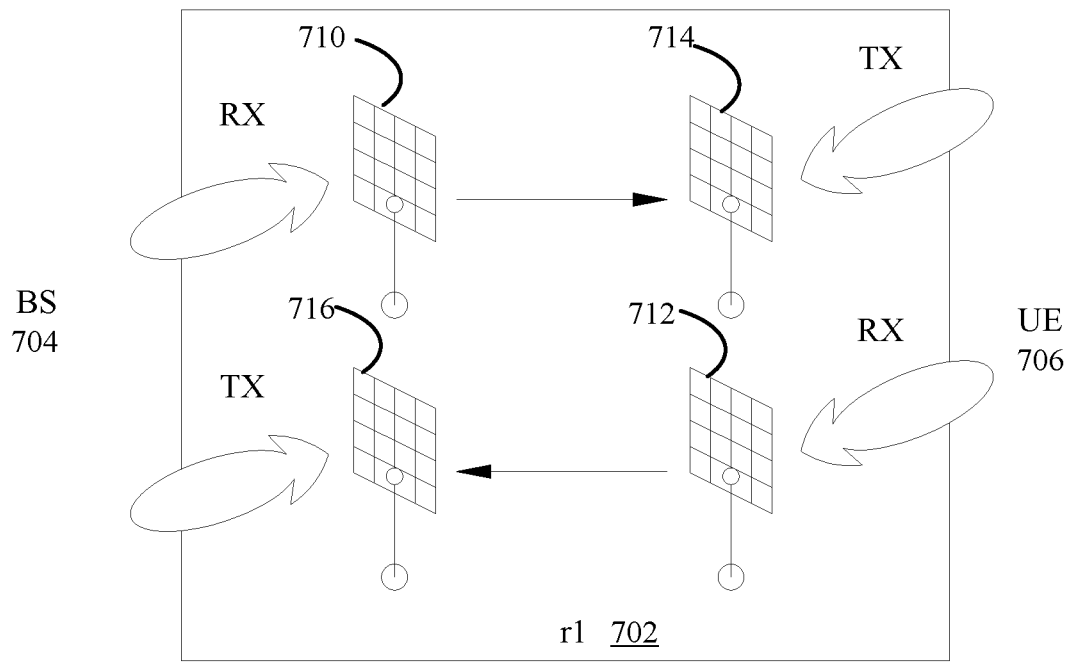

FIGS. 7A and 7B provide additional details of how repeaters may help effectively overcome challenge of a blockage by one or more objects. As illustrated in FIG. 7A, a traditional repeater receives an RF signal in one panel (corresponding to a receive or Rx beam) and (re-)transmits the RF signal in another panel (corresponding to a transmit or Tx beam). For example, the repeater simply amplifies the received RF signal and forwards the RF signal to become the transmitted RF signal (Amplify-and-forward).

In the example illustrated in FIG. 7A, a repeater r1 702 is able to receive the RF signal (for example, during DL) from a BS 704 and relay the RF signal to a UE 706, which may be blocked from receiving the RF signal directly from the BS 704 due to a presence of an object 708 (for example, a tree) between the BS 704 and the UE 706. In other direction (for example, during UL), the repeater r1 702 may receive the RF signal from the UE 706 and relay the RF signal to the BS 704.

As illustrated in FIG. 7B, the repeater r1 702 may include receive panels (for example, a first receive panel 710 and a second receive panel 712) and transmit panels (for example, a first transmit panel 714 and a second transmit panel 716), which may be used to implement some fixed beam patterns. For wide coverage, the beam patterns are usually wide, therefore not achieving high array gains. The repeater r1 702 is typically not aware of whether the RF signal is a DL signal or an UL signal in a TDD system and operates in both directions (full duplex) simultaneously.

Figure 8:
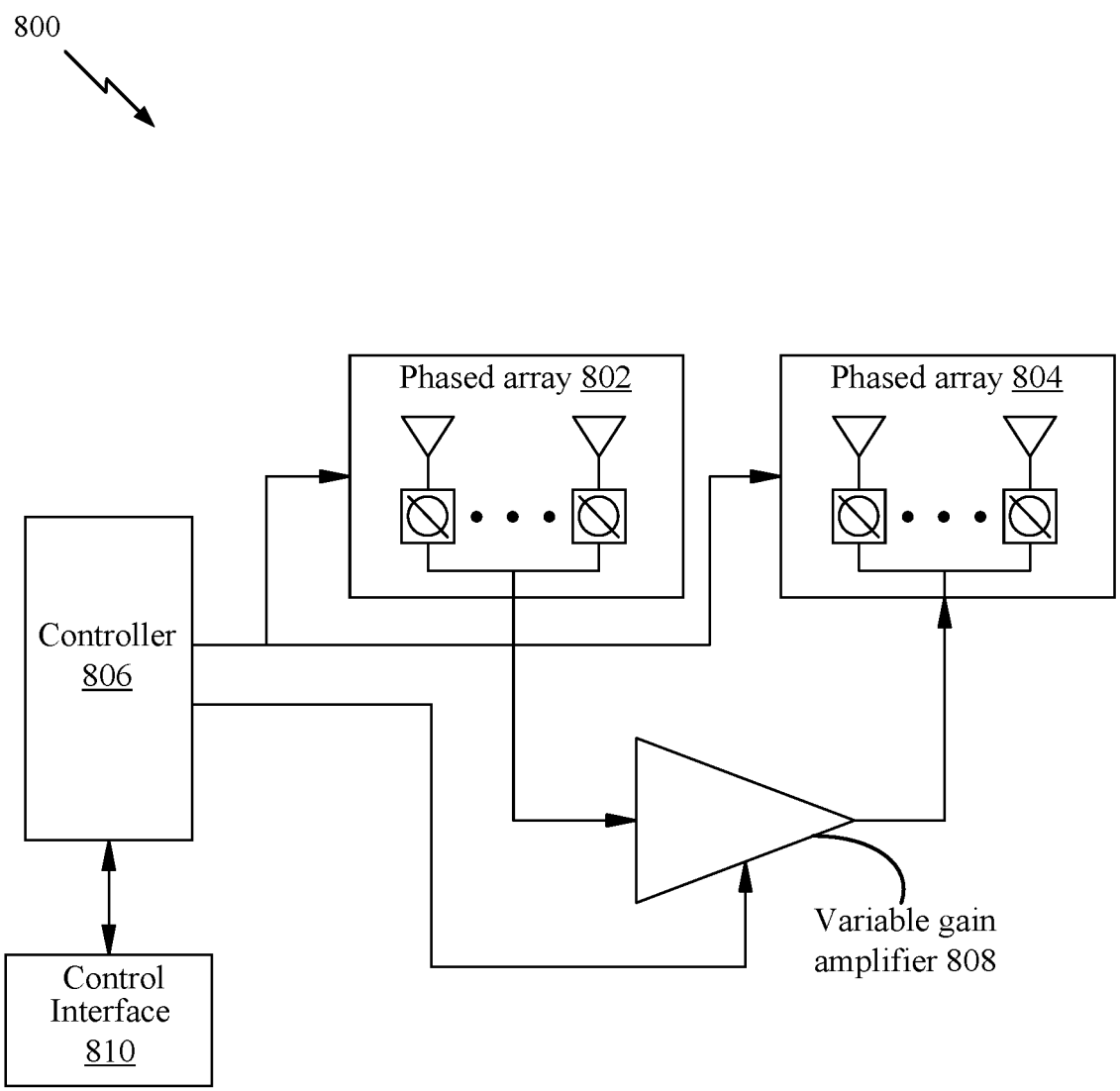
FIG. 8 is a block diagram of an example architecture for a directional repeater.

FIG. 8 illustrates a schematic view of an example architecture 800 for a repeater (e.g., an L1 repeater). As noted above, the repeater may perform operations of receiving an analog RF signal on its receiver (RX) antennas (e.g., based on some configured RX beamforming), amplifying power of the received analog RF signal, and transmitting the amplified analog RF signal from its transmitter (TX) antennas (e.g., based on some configured TX beamforming).

As illustrated, beamforming may be accomplished via phased antenna arrays (for example, a first phased antenna array 802 and a second phased antenna array 804) configured by a controller 806, while the amplification may be accomplished by a variable gain amplifier 808. The repeater may also communicate some control signals with a server (e.g., a BS serving as a donor, a control node, etc.) via a control interface 810. The control interface 810 may be implemented out-of-band (e.g., operating outside a carrier frequency on which the RX signal is received) or in-band (e.g., using a smaller bandwidth part of a same carrier frequency). An out-of-band control interface may be implemented, for example, via a separate (e.g. a low-frequency) modem using a different radio technology (for instance, a Bluetooth) or different frequency (for instance, LTE NB-IoT).

Example Initial Beam Sweep for a Smart Directional Repeater

Figure 9:
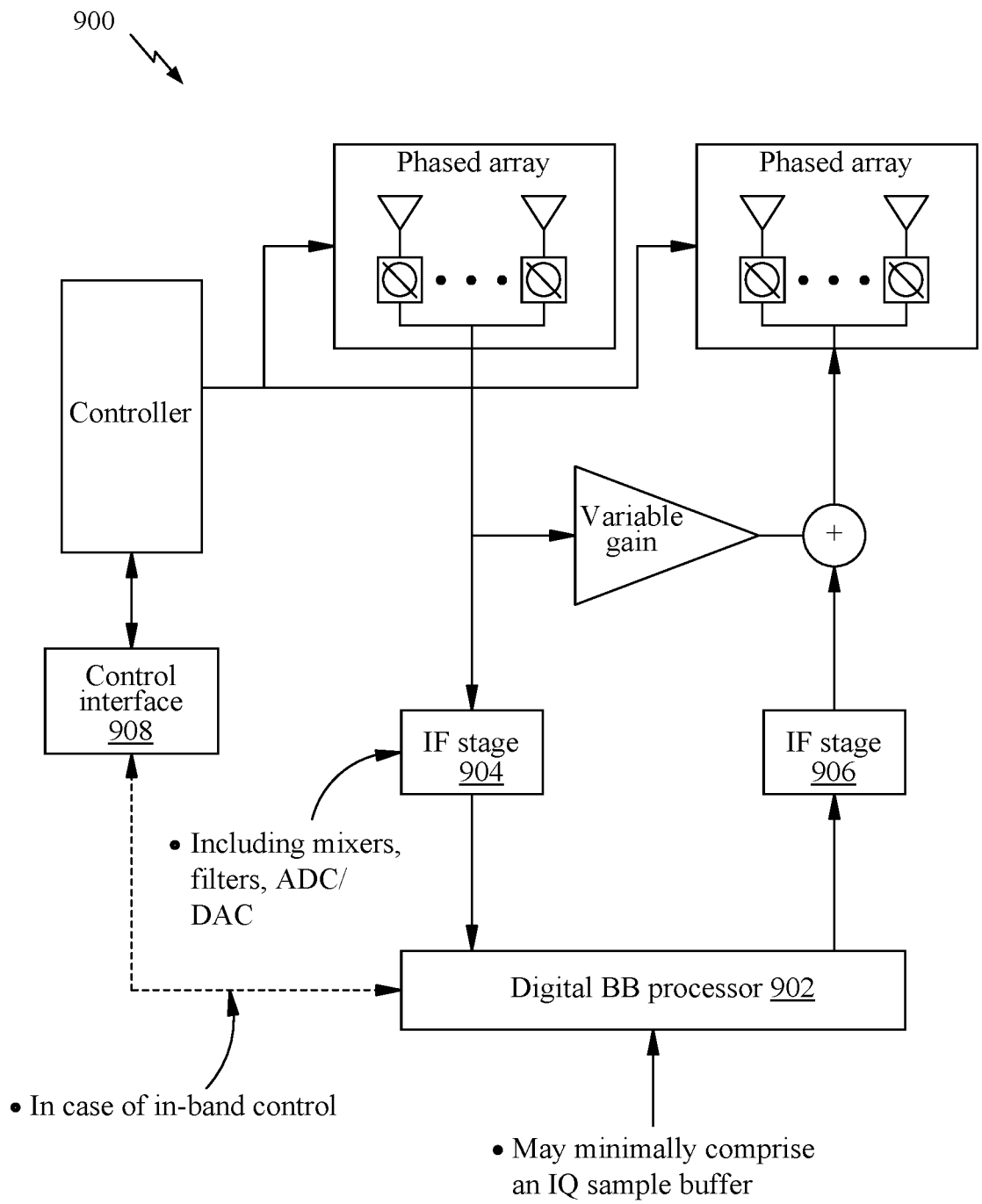
FIG. 9 is a block diagram of an example architecture for a directional repeater, in accordance with certain aspects of the present disclosure.

FIG. 9 shows an example architecture 900 for an enhanced repeater (for example, a smart repeater), in accordance with aspects of the present disclosure. As illustrated, the enhanced repeater may have additional components when compared to a base architecture of FIG. 8, which may allow the enhanced repeater, for example, to optimize beam selection for receiving and/or transmitting RF signals.

As illustrated, the enhanced repeater of FIG. 9 may have components that may allow the enhanced repeater to at least limited baseband processing. Such components may include a digital baseband (BB) processor 902 (with at least limited baseband capability, for example, relative to a UE or gNB). The components of the enhanced repeater may also include intermediate frequency (IF) stages (for example, a first IF stage 904 and a second IF stage 906) including mixers, filters, analog-to-digital converters (ADCs), digital-to-analog converters (DACs), and the like designed to convert a received RF signal to an IF signal, take and store digital (IQ) samples, and generate the RF signal from the stored digital samples. For this purpose, the enhanced repeater may include at least sufficient storage to implement a buffer to store the IQ samples.

The enhanced repeater of FIG. 9 may also include a control interface 908 to receive control signaling form a BS (e.g., to indicate how to store and process digital samples). As described above, the control signaling may be in-band or out-of-band. In the case of the in-band control, the digital BB processor 902 may be used to extract the control signaling from the received RF signal. In some implementations, a right branch where the digital BB processor 902 produces an output to an IF stage (for example, the first IF stage 904 or the second IF stage 906) that gets summed with an analog path for an onward link, which may not exist (or be enabled) for a link to a UE from the smart repeater. On the other hand, for the link from the repeater to the gNB, this branch may be used to sum the signal coming from the UE (and going to the gNB) with any locally generated signal that the smart repeater has to concurrently send to the gNB.

Aspects of the present disclosure provide techniques for performing an initial beam sweep of transmissions (e.g., SSBs) from the BS to an enhanced directional repeater, such as the smart repeater described above with reference to FIG. 9. As will be described in greater detail below, by selecting a first set of one or more beams used by the smart repeater for receiving the transmissions and a second set of one or more beams used by the smart repeater for relaying the transmissions, acquisition and access procedures involving the smart repeater may be enhanced (relative to the architecture shown in FIG. 8) to provide better coverage and make more efficient use of time, frequency, and spatial resources.

As noted above, in a conventional (baseline) repeater architecture, a data-path may be completely analog. In other words, the repeater does not further process the analog RF signal that has to be relayed, rather the RF signal is forwarded in its analog form (without any digital BB processing).

In contrast, the smart repeater can be controlled by a BS (e.g., the eNB/gNB), for example, in terms of transmit and receive switching and beamforming to adjust beams of the smart repeater to beamform (for instance, steer/point transmissions) to/from a particular UE being served. In systems, such as 5G, the UE scheduled at any particular instance is dynamic, meaning the optimal setting for the beamforming is also dynamic. The optimal beamforming settings, for example, may allow for a selection of broader beams, for example, for discovery or acquisition purposes, or narrower beams to increase antenna gain, receive power and signal to noise ratio (SNR).

The connection set up procedure in millimeter wave systems typically starts with the BS sweeping transmission of SSBs over different beam directions. The UE typically finds a best beam direction, based on how the UE receives the SSBs and access the wireless communication system using known DL/UL beam correspondence information (and reciprocity).

For example, each SSB may indicate an index corresponding to that SSBs relative (symbol) location within an SSB burst. Each SSB index may have a corresponding set of resources to use for random access channel (RACH) transmissions. Thus, the BS knows what resources to monitor for the RACH transmissions, which direction (Rx beam) to listen with and, based on which resources are used, knows which beam was best for that particular UE.

When the directional repeater is used to extend coverage, potentially, a similar type of initial beam sweep may be beneficial, to select optimal beams for transmissions from both the gNB and the repeater. Ideally, this beam sweep should be done in a manner that is transparent to the UE (that is unaware of the repeater's existence), maintains the DL/UL beam correspondence (between the SSBs and RACH resources), and is consistent with conventional access procedures followed by legacy UEs.

Figure 10:
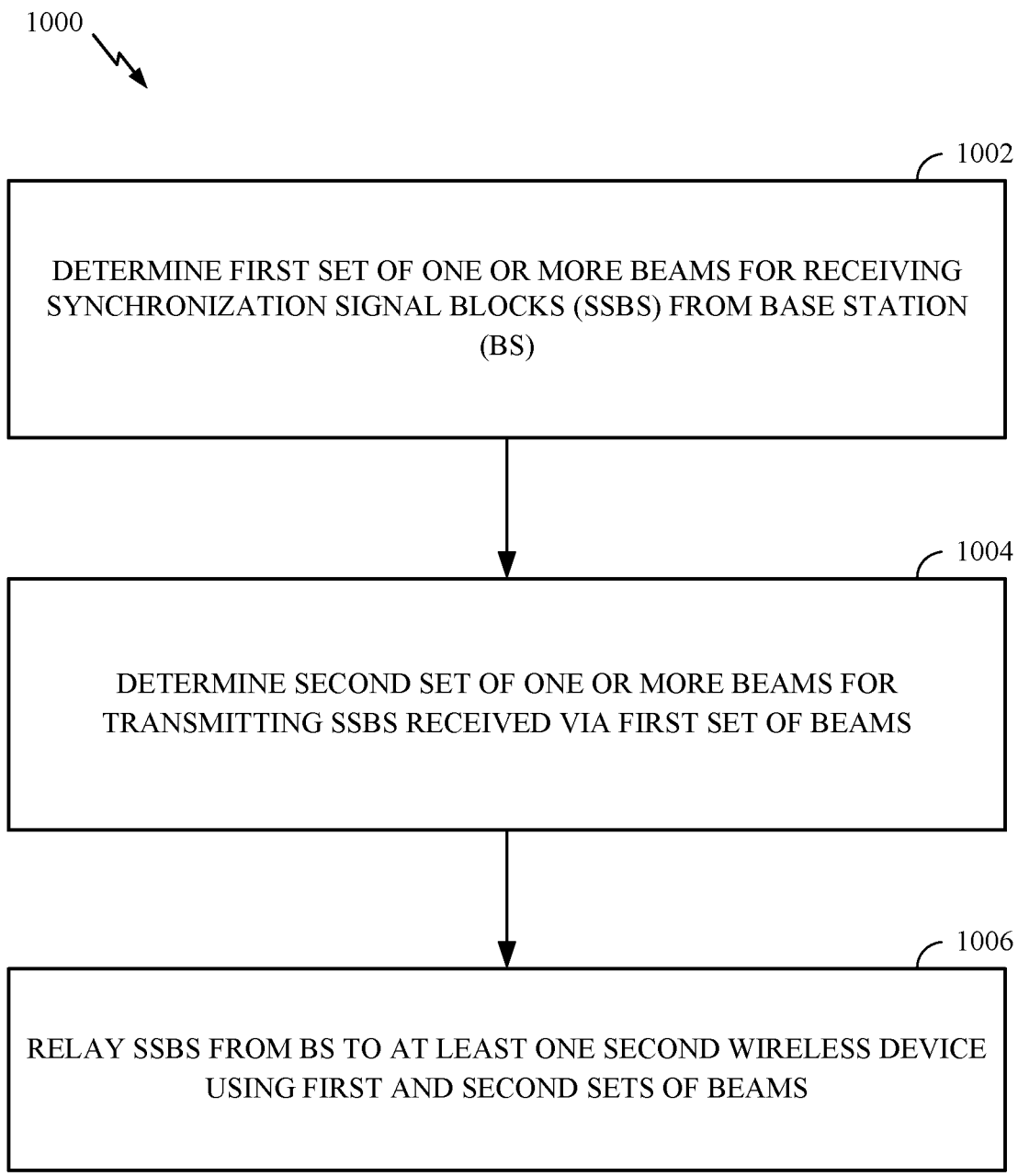
FIG. 10 illustrates example operations that may be performed by a directional repeater, in accordance with certain aspects of the present disclosure.
Figure 11:
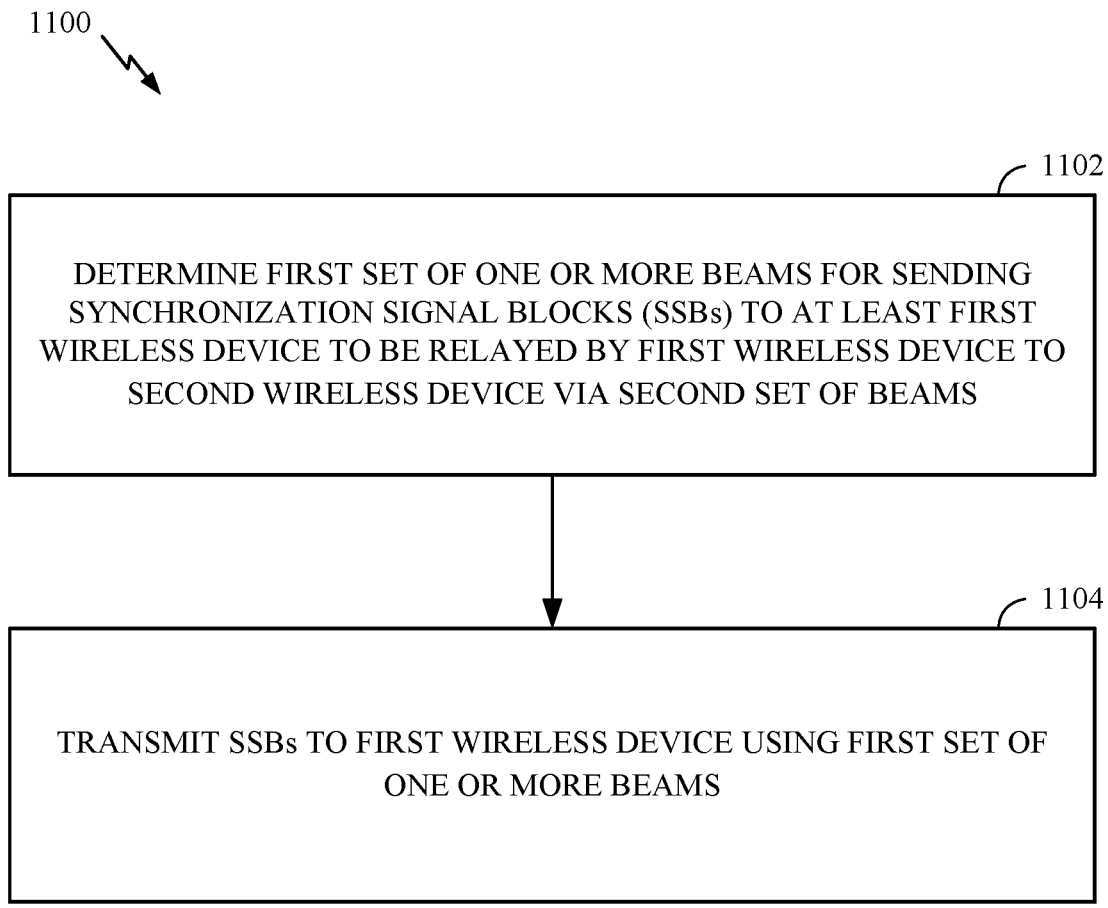
FIG. 11 illustrates example operations that may be performed by a BS, in accordance with certain aspects of the present disclosure.

FIGS. 10 and 11 illustrate example operations for performing an initial beam sweep of transmissions from a BS to be relayed by an enhanced directional repeater, from the enhanced directional repeater and the BS perspectives, respectively. In some cases, the BS and the enhanced directional repeater may perform an initial sweep after or as part of an initial access procedure performed to establish a link between the enhanced directional repeater and the BS.

FIG. 10 illustrates example operations 1000 for wireless communication by a first wireless device, in accordance with certain aspects of the present disclosure. The operations 1000 may be performed, for example, by a repeater (e.g., any of the repeaters shown in FIG. 1, 6, 7, 9, or 12 or any electronic device acting as a repeater).

Operations 1000 begin, at 1002, by determining a first set of one or more beams for receiving SSBs from a BS. At 1004, the first wireless device determines a second set of one or more beams for transmitting the SSBs received via the first set of beams. At 1006, the first wireless device relays the SSBs from the BS to at least one second wireless device using the first and the second sets of one or more beams.

FIG. 11 illustrates example operations 1100 for wireless communication by a BS, in accordance with certain aspects of the present disclosure. The operations 1100 may be performed, for example, by any of the BSs/gNBs (as shown in FIG. 1, 6, 7, or 12) to initialize an enhanced repeater performing operations 1000.

Operations 1100 begin, at 1102, by determining a first set of one or more beams for sending SSBs to at least a first wireless device, to be relayed by the first wireless device to a second wireless device via a second set of one or more beams. At 1104, the BS transmits the SSBs to the first wireless device using the first set of one or more beams.

Figure 12:
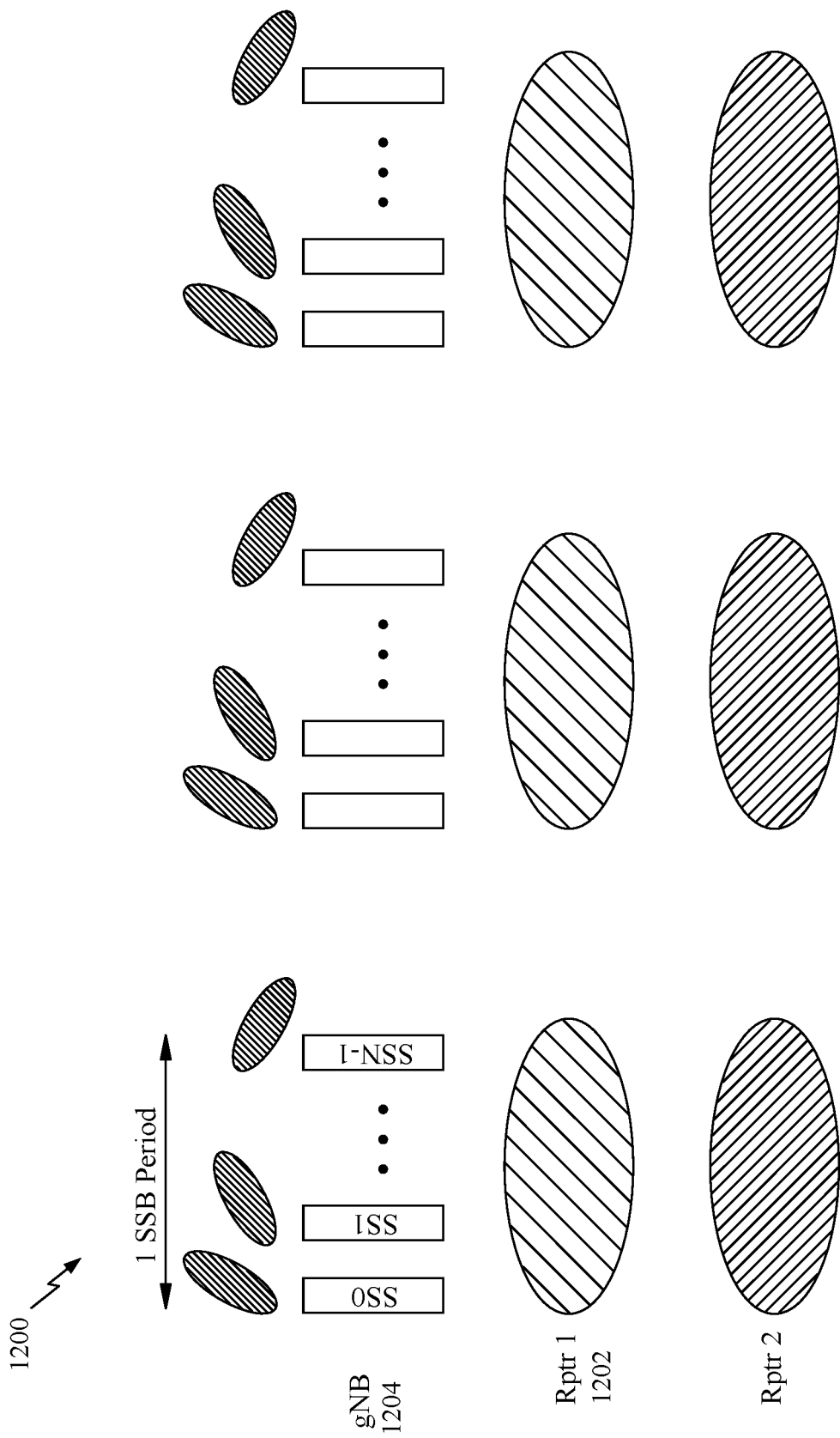
FIG. 12 illustrates one option for an initial beam sweep between a BS and a repeater, in accordance with certain aspects of the present disclosure.
Figure 13:
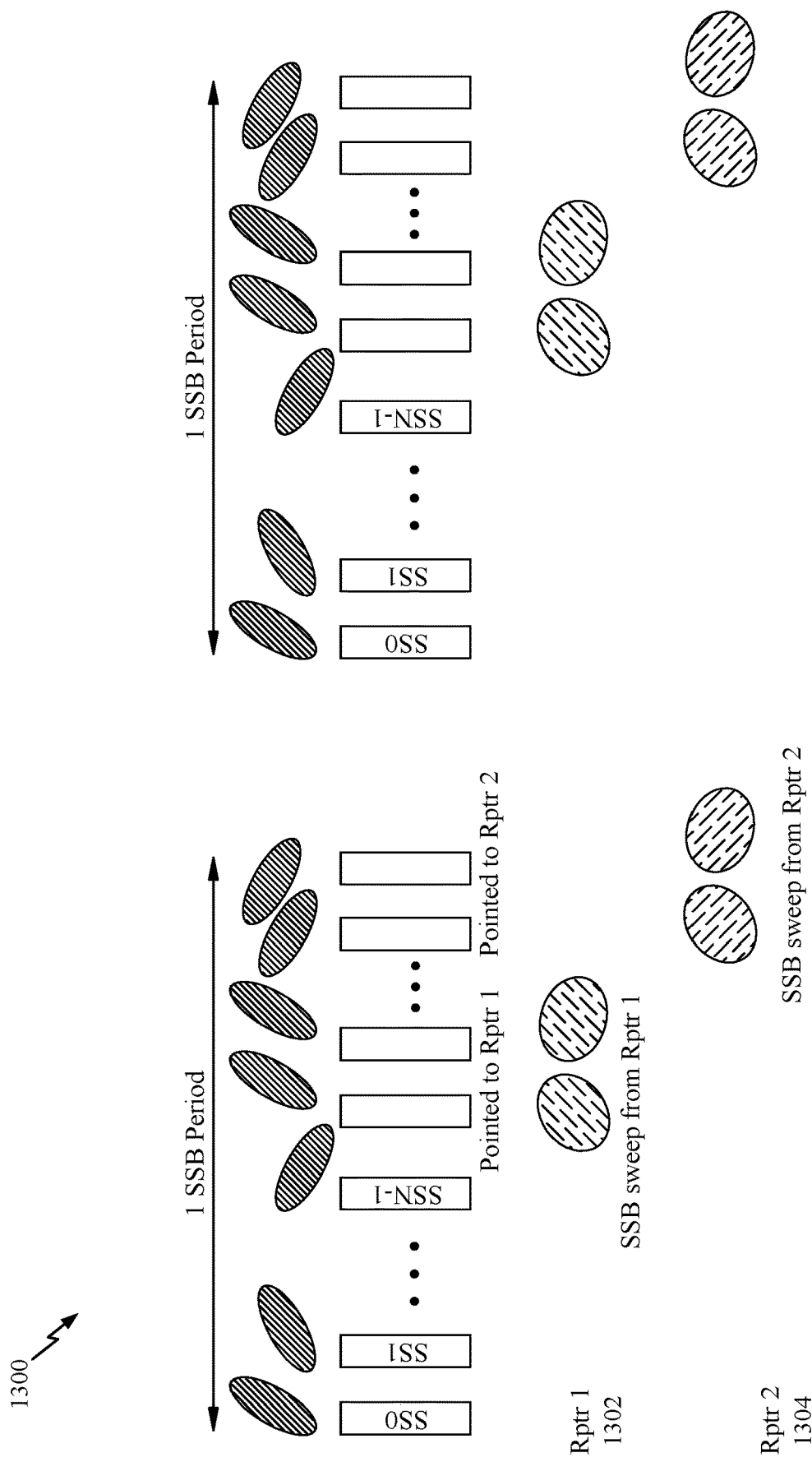
FIG. 13 illustrates another option for an initial beam sweep between a BS and a repeater, in accordance with certain aspects of the present disclosure.
Figure 14:
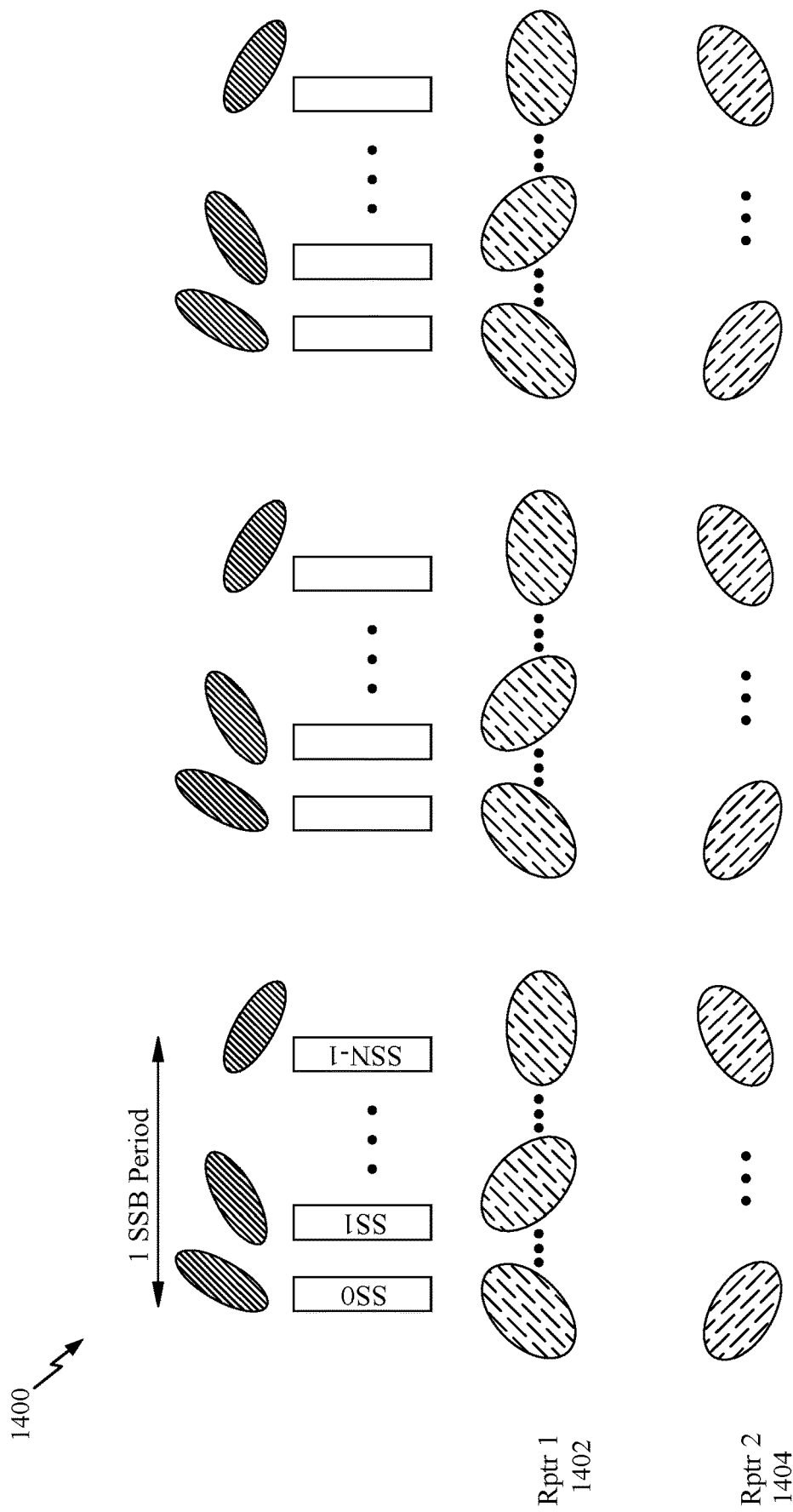
FIG. 14 illustrates yet another option for an initial beam sweep between a BS and a repeater, in accordance with certain aspects of the present disclosure.

FIGS. 12-14 illustrate different solutions for an initial beam sweep that can be used in different situations by different repeaters (for example, smart repeaters). The solutions are designed to ensure that SSB sweep (pattern) from a gNB and a repeater happen during same synchronization signal (SS) burst and match from burst-to-burst, in an effort to keep UE operation unaffected (for instance, transparent). The illustrated examples may assume that the gNB to the repeater link has been established, for example, using an access procedure similar to that used to establish a normal gNB to (non-repeater) the UE link.

In a first option 1200 illustrated in FIG. 12, a repeater 1202 uses a single broad beam to transmit swept SSBs the repeater 1202 may receive from a gNB 1204. In this example, in each period, each of the N SSBs (SS0, SS1 . . . SSN−1) in a block may be sent using a different beam.

This approach in the first option may be useful, for example, when an angular space covered by the repeater 1202 is limited. While the broad beam is associated with a low antenna gain and a corresponding low SNR, this approach in the first option may be feasible due to a high processing gain on SSBs due to a signal design.

While the broad beam may be sufficient for relaying the SSBs, the broad beam may result in insufficient SNR for other access related messages, such as sending a random access response (RAR). One approach to remedy this situation is for the repeater 1202 to perform a sweep across multiple narrower beams within a UE RAR window (when transmitting/relaying an RAR message).

FIG. 13 illustrates a second option 1300 where one or more repeaters (for example, a first repeater 1302 and a second repeater 1304) may use TDM for its SSB sweeps, with that of a gNB in a coordinated fashion with the gNB. As illustrated, in this case, the SSB period may be split, with a conventional sweep of N SSBs (SS0, SS1 . . . SSN−1) followed by a separate period in which the gNB transmits multiple SSBs with a same beam, holding a same direction, while the one or more repeaters may sweep across a set of beams.

As illustrated, the gNB may repeat this for multiple repeaters (for example, the first repeater 1302 and the second repeater 1304), each time transmitting multiple SSBs with a same beam pointed to a corresponding repeater. For example, the gNB may have determined a best beam for each repeater and use that beam to repeat the SSBs for each transmitter. This approach allows the SSB periodicity to be maintained, which may allow support for legacy devices (e.g., that only expect the first N SSBs). In some cases, rather than keep a same Rx beam at the repeater, SSB beams from a BS may be mandate different Rx beams at the repeater. For example, beam training performed between the one or more repeaters and the BS may indicate such a relationship. In such a case, the one or more repeaters may set its Rx beam appropriately based on which the SSB is being transmitted by the gNB.

While the approach shown in FIG. 13 adds flexibility and improves link budget (when compared to a broad beam option shown in FIG. 12), this approach comes at a cost of additional resources. For example, in the illustrated example, 2 additional SSB resources (in addition to conventional N SSBs) are used for each repeater. Further, the more directions swept by the one or more repeaters, the more SSB resources are used. Thus, the second option has limitation in how it scales with additional repeaters per gNB.

In some cases, spatial division multiplexing (SDM) may be used as an alternative (or in addition) to the TDM shown in FIG. 13 to reduce an amount of time resources needed. For example, a BS with multiple panels may transmit the SSBs in multiple directions at a same time to save resources. With this approach, multiple repeaters, such as the first repeater 1302 and the second repeater 1304 could sweep (e.g., with panel 1 used to transmit to repeater 1 . . . and panel N used to transmit to repeater N).

FIG. 14 illustrates a third option 1400 for an initial beam sweep, where a first repeater 1402 selects some SSB beams from gNB and sweeps just during those transmissions. As illustrated, the gNB may perform just a conventional sweep of N SSBs each SSB period, while the first repeater 1402 identifies one or more beams from the gNB on which the first repeater 1402 can receive a signal and sweeps in one of its chosen beam directions for each instance. This approach results in a reduced overhead while still offering some ability for the first repeater 1402 to sweep.

The third option shown in FIG. 14, in general avoids an overhead increase resulting from TDM approach, basically allowing the first repeater 1402 to find a beam (or beams) to use. This approach may not be atypical, because often in line of sight (LOS) deployed repeaters, even side lobes of some beams may be sufficient for this approach (particularly since SSB/RACH detection does not require high SNR but may not be suitable for data transmissions).

While the example shown in FIG. 14 shows each repeater (for example, the first repeater 1402 and a second repeater 1404) using beams that are of same width, in some cases, each repeater may use a mix of wider and narrower beams to sweep. For example, in some cases, each repeater may decide for which of the gNB beams (SSBs), it should use broad beams to transmit on its link to UE and for which gNB beams it needs an array gain of narrow beams.

In some cases, each repeater may take other such actions itself based on some considerations. For example, each repeater may decide that there are certain SSBs for which each repeater need not sweep, but can just amplify and forward a strong signal (autonomously improving utilization of resources).

Of course, variations to the approaches described above are possible. For example, strict correspondence of beam directions across SS bursts may be relaxed in some cases. In other words, while current wireless systems implicitly assumes that the beam mapping to SSB remains the same from SS burst to SS burst, there is no one to one correspondence between the SS burst and a RACH association period. As a result, when the UE sends a RACH transmission, it may not be possible to tell on which SS burst it measured SS RSRP on which it based its selection of RACH resources.

In some cases, using in-band control, the gNB could pick one of sweep options described herein (e.g., per FIGS. 12-14) and signal which is to be used by the repeater. In some cases, the gNB and/or the repeater may select an option and/or select a particular set of beams to use for a sweep based on a number of other factors (e.g., based on history the gNB or the repeater may learn a layout).

In some cases, for the third option shown in FIG. 13, the assumption that the repeaters (for example, the first repeater 1402 and the second repeater 1404) need unique opportunities to sweep may not be necessary. For example, more than 1 beam may be good for the first repeater 1402, so the first repeater 1402 may find out both beams are good, so the first repeater 1402 may need to sweep an additional beam (so the first repeater 1402 may hold a same beam for TDM).

In some cases, the repeater may know the RACH association period and a maximum value may be set, for example, to 160 ms per spec. In such cases, the repeater may be allowed to sweep different SS beams across different association periods. In such cases, the repeater may use most recent beams used for RACH reception in an association period.

Benefits of this approach may be reduced overhead for the second option shown in FIG. 13 and an ability to cover possible coverage holes left when using the third option shown in FIG. 14. One potential drawback is that the UE behavior may be unknown when beams change (for instance, when the repeater changes what beams it sweeps) from one SS burst to another. For typical UE operation, however, there may be minimal degradation After sweeping the (relayed) SSBs per one of the options described above, the repeater may monitor for the RACH transmissions by UEs detecting the (relayed) SSBs. The repeater may participate in the RACH procedure, assisting in the exchange of RACH messages between a BS and the UE. If transparency is maintained, as desired, the UE is unaware of the repeater's existence and cannot distinguish it from the gNB.

As per a normal RACH operation, the UE may select the SSB whose SS RSRP was adequate and transmit a RACH preamble in the RACH occasion corresponding to that SSB. The repeater may maintain the correspondence of its beam(s) with that of the gNB's. For example, if the repeater used Rx beam m on the link between the repeater and the gNB and transmitted on Tx beam n, for SS burst k, then, for the corresponding RACH occasion, the repeater will receive the RACH on Rx beam n and transmit (relay the RACH) on Tx beam m to the gNB.

Example Embodiments

Embodiment 1: An apparatus for wireless communications by a first wireless device, comprising a memory; a processor coupled with the memory, the memory and the processor configured to determine a first set of one or more beams for receiving synchronization signal blocks (SSBs) from a base station (BS); determine a second set of one or more beams for transmitting the SSBs received via the first set of beams; and relay the SSBs from the BS to at least one second wireless device using the first and the second sets of one or more beams.

Embodiment 2: The apparatus of Embodiment 1, wherein the SSBs are received in bursts; and the first and the second sets of one or more beams are used across bursts.

Embodiment 3: The apparatus of any of Embodiments 1-2, wherein the memory and the processor are further configured to perform a random access procedure with the BS; and receive an indication of the SSBs designated for the first wireless device for the relaying.

Embodiment 4: The apparatus of any of Embodiments 1-3, wherein at least one beam of the second set of one or more beams is used to relay the SSBs received from the BS using different beams of the first set of one or more beams.

Embodiment 5: The apparatus of any of Embodiments 1-4, wherein the second set of one or more beams comprises a single broad beam.

Embodiment 6: The apparatus of Embodiment 5, wherein the memory and the processor are further configured to receive a random access channel (RACH) transmission from the at least one second wireless device; and use multiple beams within the second set of one or more beams, narrower than the single broad beam, to relay a random access response (RAR) to the at least one second wireless device.

Embodiment 7: The apparatus of any of Embodiments 1-6, wherein the first set of one or more beams comprises a same beam used to receive the SSBs from the BS.

Embodiment 8: The apparatus of Embodiment 7, wherein the second set of one or more beams comprises multiple beams to relay the SSBs received using the same beam.

Embodiment 9: The apparatus of Embodiment 8, wherein the memory and the processor are further configured to change the beams in the second set of one or more beams for different RACH association periods.

Embodiment 10: The apparatus of any of Embodiments 1-9, wherein the second set of one or more beams comprises at least one beam that is broader relative to at least one narrower beam of the second set of one or more beams.

Embodiment 11: The apparatus of Embodiment 10, wherein the memory and the processor are further configured to decide for which beams of the first set of one or more beams to use a broader beam to relay the SSBs; and decide for which beams of the first set of one or more beams to use the at least one narrower beam to relay the SSBs.

Embodiment 12: The apparatus of Embodiment 10, further comprising change beams in the second set of one or more beams for different RACH association periods.

Embodiment 13: The apparatus of any of Embodiments 1-12, wherein the memory and the processor are further configured to participate in a RACH procedure with the at least one second wireless device; and maintain a correspondence between beams of the first and the second sets of one or more beams used for relaying the SSBs, when participating in the RACH procedure.

Embodiment 14: The apparatus of Embodiment 13, wherein maintaining the correspondence comprises: using a same beam of the second set of one or more beams that was used to transmit the SSBs to the at least one second wireless device for receiving one or more messages from the at least one second wireless device during the RACH procedure; and using a same beam of the first set of one or more beams that was used to receive the SSBs from the BS for transmitting one or more messages to the BS during the RACH procedure.

Embodiment 15: An apparatus for wireless communications by a base station (BS), comprising a memory; a processor coupled with the memory, the memory and the processor configured to determine a first set of one or more beams for sending synchronization signal blocks (SSBs) to a first wireless device, to be relayed by the first wireless device to a second wireless device via a second set of one or more beams; and transmit the SSBs to the first wireless device using the first set of one or more beams.

Embodiment 16: The apparatus of Embodiment 15, wherein the SSBs are transmitted in bursts; and the BS uses the same first set of one or more beams across the bursts.

Embodiment 17: The apparatus of any of Embodiments 15-16, wherein the memory and the processor are further configured to perform a random access procedure with the first wireless device; and provide an indication of the SSBs designated for the first wireless device for relaying.

Embodiment 18: The apparatus of any of Embodiments 15-17, wherein at least one beam of the second set of one or more beams is used to relay the SSBs received from the BS using different beams of the first set of one or more beams.

Embodiment 19: The apparatus of Embodiment 18, wherein the second set of one or more beams comprises a single broad beam.

Embodiment 20: The apparatus of any of Embodiments 15-19, wherein the first set of one or more beams comprises a same beam used to transmit the SSBs to the first wireless device.

Embodiment 21: The apparatus of Embodiment 20, wherein the first set of one or more beams also comprises another same beam used to transmit the SSBs to another first wireless device, to be relayed by the other first wireless device.

Embodiment 22: The apparatus of Embodiment 21, wherein the BS transmits the SSBs to the first wireless device and the other first wireless device using at least one of a time division multiplexing (TDM) or a spatial division multiplexing (SDM).

Embodiment 23: The apparatus of any of Embodiments 15-22, wherein the second set of one or more beams comprises at least one beam that is broader relative to at least one narrower beam of the second set of one or more beams.

Embodiment 24: The apparatus of any of Embodiments 15-23, wherein the memory and the processor are further configured to participate in a random access channel (RACH) procedure with the second wireless device, via an exchange of messages relayed by the first wireless device.

Embodiment 25: A method for wireless communications by a first wireless device, comprising determining a first set of one or more beams for receiving synchronization signal blocks (SSBs) from a base station (BS); determining a second set of one or more beams for transmitting the SSBs received via the first set of beams; and relaying the SSBs from the BS to at least one second wireless device using the first and the second set of one or more beams.

Embodiment 26: The method of Embodiment 25, wherein the SSBs are received in bursts; and the same first and the second sets of one or more beams are used across the bursts.

Embodiment 27: The method of any of Embodiments 25-26, further comprising performing a random access procedure with the BS; and receiving an indication of the SSBs designated for the first wireless device for the relaying.

Embodiment 28: The method of any of Embodiments 25-27, wherein at least one beam of the second set of one or more beams is used to relay the SSBs received from the BS using different beams of the first set of one or more beams.

Embodiment 29: A method for wireless communications by a base station (BS), comprising determining a first set of one or more beams for sending synchronization signal blocks (SSBs) to at least a first wireless device, to be relayed by the first wireless device to a second wireless device via a second set of one or more beams; and transmitting the SSBs to the first wireless device using the first set of one or more beams.

Embodiment 30: The method of Embodiment 29, wherein the SSBs are transmitted in bursts; and the BS uses the same first set of one or more beams across the bursts.

Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for receiving or means for obtaining may include a receiver (such as the receive processor 338) or an antenna(s) 334 of the AP 110 or the receive processor 358 or antenna(s) 352 of the UE 120 illustrated in FIG. 3. Means for transmitting or means for outputting may include a transmitter (such as the transmit processor 320) or an antenna(s) 334 of the AP 110 or the transmit processor 364 or antenna(s) 352 of the UE 120 illustrated in FIG. 3. Means for associating, means for determining, means for monitoring, means for deciding, means for providing, means for detecting, means for performing, and/or means for setting may include a processing system, which may include one or more processors, such as the receive processor 338/358, the transmit processor 320/364, the TX MIMO processor 330/366, or the controller 340/380 of the AP 110 and the UE 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications by a first wireless device, comprising:
   a memory; and
   a processor coupled with the memory, the memory and the processor configured to:
      relay synchronization signal blocks (SSBs) of an SSB burst from a network entity to at least one second wireless device using a first set of one or more beams for receiving the SSBs from the network entity and a second sets of one or more beams for transmitting the SSBs received via the first set of beams, wherein at least one beam of the second set of one or more beams is used to relay the SSBs received from the network entity using different beams than the first set of one or more beams;
      match a correspondence between beams of the first and the second set of one or more beams used for relaying the SSBs, wherein matching the correspondence comprises:
         using a same beam of the second set of one or more beams that was used to transmit the SSBs to the at least one second wireless device for receiving one or more messages from the at least one second wireless device; and
         using a same beam of the first set of one or more beams that was used to receive the SSBs from the network entity for transmitting one or more messages to the network entity.

2. The apparatus of claim 1, wherein the SSBs are received in bursts; and the first and the second sets of one or more beams are used across bursts.

3. The apparatus of claim 1, wherein the memory and the processor are further configured to:
   perform a random access procedure with the network entity; and
   receive an indication of the SSBs designated for the first wireless device for the relaying.

4. The apparatus of claim 1, wherein the second set of one or more beams comprises a single broad beam.

5. The apparatus of claim 4, wherein the memory and the processor are further configured to:
   receive a random access channel (RACH) transmission from the at least one second wireless device; and
   use multiple beams within the second set of one or more beams, narrower than the single broad beam, to relay a random access response (RAR) to the at least one second wireless device.

6. The apparatus of claim 1, wherein the first set of one or more beams comprises a same beam used to receive the SSBs from the network entity.

7. The apparatus of claim 6, wherein the second set of one or more beams comprises multiple beams to relay the SSBs received using the same beam.

8. The apparatus of claim 7, wherein the memory and the processor are further configured to:
change the beams in the second set of one or more beams for different RACH association periods.

9. The apparatus of claim 1, wherein the second set of one or more beams comprises at least one beam that is broader relative to at least one narrower beam of the second set of one or more beams.

10. The apparatus of claim 9, wherein the memory and the processor are further configured to:
decide for which beams of the first set of one or more beams to use a broader beam to relay the SSBs; and
decide for which beams of the first set of one or more beams to use the at least one narrower beam to relay the SSBs.

11. The apparatus of claim 9, wherein the memory and the processor are further configured to:
change beams in the second set of one or more beams for different RACH association periods.

12. The apparatus of claim 1, wherein the memory and the processor are further configured to:
participate in a RACH procedure with the at least one second wireless device; and
maintaining the correspondence between the beams of the first and the second sets of one or more beams used for relaying the SSBs, when participating in the RACH procedure.

13. The apparatus of claim 12, wherein maintaining the correspondence comprises:
using the same beam of the second set of one or more beams that was used to transmit the SSBs to the at least one second wireless device for receiving the one or more messages from the at least one second wireless device during the RACH procedure; and
using the same beam of the first set of one or more beams that was used to receive the SSBs from the network entity for transmitting the one or more messages to the network entity during the RACH procedure.

14. An apparatus for wireless communications by a network entity, comprising:
a memory; and
a processor coupled with the memory, the memory and the processor configured to:
transmit synchronization signal blocks (SSBs) of an SSB burst to a first wireless device using a first set of one or more beams for sending SSBs to the first wireless device, to be relayed by the first wireless device to a second wireless device via a second set of one or more beams, wherein at least one beam of the second set of one or more beams is used to relay the SSBs received from the network entity using different beams than the first set of one or more beams; and
match a correspondence between beams of the first set of one or more beams used for relaying the SSBs, wherein matching the correspondence comprises using a same beam of the first set of one or more beams that was used to transmit the SSBs from the network entity for receiving one or more messages from the first wireless device.

15. The apparatus of claim 14, wherein the SSBs are transmitted in bursts; and the network entity uses the same first set of one or more beams across the bursts.

16. The apparatus of claim 14, wherein the memory and the processor are further configured to:
perform a random access procedure with the first wireless device; and
provide an indication of the SSBs designated for the first wireless device for relaying.

17. The apparatus of claim 14, wherein the second set of one or more beams comprises a single broad beam.

18. The apparatus of claim 14, wherein the first set of one or more beams comprises a same beam used to transmit the SSBs to the first wireless device.

19. The apparatus of claim 18, wherein the first set of one or more beams also comprises another same beam used to transmit the SSBs to another first wireless device, to be relayed by the other first wireless device.

20. The apparatus of claim 19, wherein the network entity transmits the SSBs to the first wireless device and the other first wireless device using at least one of a time division multiplexing (TDM) or a spatial division multiplexing (SDM).

21. The apparatus of claim 14, wherein the second set of one or more beams comprises at least one beam that is broader relative to at least one narrower beam of the second set of one or more beams.

22. The apparatus of claim 14, wherein the memory and the processor are further configured to:
participate in a random access channel (RACH) procedure with the second wireless device, via an exchange of messages relayed by the first wireless device.

23. A method for wireless communications by a first wireless device, comprising:
relaying synchronization signal blocks (SSBs) of an SSB burst from a network entity to at least one second wireless device using a first set of one or more beams for receiving the SSBs from a network entity and a second set of one or more beams for transmitting the SSBs received via the first set of beams, wherein at least one beam of the second set of one or more beams is used to relay the SSBs received from the network entity using different beams than the first set of one or more beams; and
matching a correspondence between beams of the first and the second sets of one or more beams used for relaying the SSBs, wherein matching the correspondence comprises:
using a same beam of the second set of one or more beams that was used to transmit the SSBs to the at least one second wireless device for receiving one or more messages from the at least one second wireless device; and
using a same beam of the first set of one or more beams that was used to receive the SSBs from the network entity for transmitting one or more messages to the network entity.

24. The method of claim 23, wherein the SSBs are received in bursts; and the same first and the second sets of one or more beams are used across the bursts.

25. The method of claim 23, further comprising:
performing a random access procedure with the network entity; and
receiving an indication of the SSBs designated for the first wireless device for the relaying.

26. A method for wireless communications by a network entity, comprising:
transmitting synchronization signal blocks (SSBs) of an SSB burst to a first wireless device using a first set of one or more beams for sending the SSBs to at least a first wireless device, to be relayed by the first wireless device to a second wireless device via a second set of one or more beams, wherein at least one beam of the second set of one or more beams is used to relay the SSBs received from the network entity using different beams than the first set of one or more beams; and matching a correspondence between beams of the first set of one or more beams used for relaying the SSBs, wherein matching the correspondence comprises using a same beam of the first set of one or more beams that was used to transmit the SSBs from the network entity for receiving one or more messages from the first wireless device.

27. The method of claim 26, wherein the SSBs are transmitted in bursts; and the network entity uses the same first set of one or more beams across the bursts.

28. The method of claim 23, further comprising:
participating in a random access channel (RACH) procedure with the second wireless device; and
maintaining a correspondence between beams of the first and the second sets of one or more beams used for relaying the SSBs, when participating in the RACH procedure, wherein maintaining the correspondence comprises:
using the same beam of the second set of one or more beams that was used to transmit the SSBs to the at least one second wireless device for receiving the one or more messages from the at least one second wireless device during the RACH procedure; and
using the same beam of the first set of one or more beams that was used to receive the SSBs from the BS for transmitting the one or more messages to the BS during the RACH procedure.

29. The apparatus of claim 1, wherein the processor coupled with the memory is further configured to:
determine the first set of one or more beams; and
determine the second set of one or more beams.

30. The apparatus of claim 14, wherein the processor coupled with the memory is further configured to:
determine the first set of one or more beams.

* * * * *